(12) United States Patent
Taira et al.

(10) Patent No.: US 8,706,265 B2
(45) Date of Patent: Apr. 22, 2014

(54) SAFETY CONTROLLER AND SAFETY CONTROL METHOD

(75) Inventors: Tetsuya Taira, Nisshin (JP); Hiroshi Bitoh, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 378 days.

(21) Appl. No.: 13/259,519

(22) PCT Filed: Jan. 31, 2011

(86) PCT No.: PCT/JP2011/000526
§ 371 (c)(1),
(2), (4) Date: Sep. 23, 2011

(87) PCT Pub. No.: WO2012/104898
PCT Pub. Date: Aug. 9, 2012

(65) Prior Publication Data
US 2012/0029659 A1    Feb. 2, 2012

(51) Int. Cl.
*G05B 11/01* (2006.01)
(52) U.S. Cl.
USPC .......................................................... 700/21
(58) Field of Classification Search
USPC .......................................................... 700/21
See application file for complete search history.

(56) References Cited

U.S. PATENT DOCUMENTS

| | | | |
|---|---|---|---|
| 8,156,251 B1* | 4/2012 | Sorensen et al. | 710/2 |
| 8,457,766 B2* | 6/2013 | Taira et al. | 700/21 |
| 8,560,094 B2* | 10/2013 | Ehrhart et al. | 700/79 |
| 2009/0210879 A1* | 8/2009 | Kaiser et al. | 718/103 |
| 2012/0191226 A1* | 7/2012 | Nordberg et al. | 700/79 |
| 2012/0245709 A1* | 9/2012 | Taira et al. | 700/11 |

FOREIGN PATENT DOCUMENTS

| | | | | |
|---|---|---|---|---|
| JP | 07-295840 A | 11/1995 | | |
| JP | 2000207228 A | * 7/2000 | | G06F 9/46 |
| JP | 2002-086379 A | 3/2002 | | |
| JP | 2006-338426 A | 12/2006 | | |
| JP | 2008-191823 A | 8/2008 | | |
| JP | 2009-251663 A | 10/2009 | | |
| JP | 2010-271759 A | 12/2010 | | |
| JP | 2010271759 A | * 12/2010 | | |

OTHER PUBLICATIONS

International Search Report dated Feb. 22, 2011 of PCT/JP2011/000526.

* cited by examiner

*Primary Examiner* — Mohammad Ali
*Assistant Examiner* — Sivalingam Sivanesan
(74) *Attorney, Agent, or Firm* — Kenyon & Kenyon LLP

(57) ABSTRACT

The present invention relates to time partitioning to enable execution of tasks in a constant cycle while guaranteeing dependence of a safety-related system. A safety controller includes a processor and a system program for controlling allocation of an execution time of the processor to tasks. The processor executes the system program to schedule tasks in accordance with scheduling information indicating, in a constant cycle, a period of one of a safety-related TP to which a safety-related task belongs and a non-safety-related TP to which a non-safety-related task belongs. In a task of a TP in the constant cycle, the processor stores the end information upon completion of processing in the task and brings the task into a ready state. In the scheduling, when the end information is stored, the processor inhibits allocation of the execution time even when the task in the TP in the constant cycle is in the ready state, and deletes the end information during a period between an end of the period of the TP in the constant cycle and a start of a period in a next cycle of the TP.

7 Claims, 29 Drawing Sheets

PERIOD OF TIME PARTITION > WORST CASE OF ACTUALLY REQUIRED

US 8,706,265 B2

SAFETY CONTROLLER AND SAFETY CONTROL METHOD

This is a 371 national phase application of PCT/JP2011/000526 filed 31 Jan. 2011, the contents of which are incorporated herein by reference.

TECHNICAL FIELD

The present invention relates to a safety controller mounted in a service robot, transportation equipment, and the like to ensure functional safety, and particularly to a safety controller using a computer system.

BACKGROUND ART

Service robots are required to ensure functional safety by constantly monitoring a safety state using an external sensor and a self-diagnosis device and by executing appropriate safety control logic upon detecting some risk.

IEC 61508 has been established as an international standard for functional safety of the service robots described above as well as systems which operate on an electrical principle, such as transportation equipment. In IEC 61508, a system provided to ensure functional safety is called a safety-related system. IEC 61508 defines various techniques for constructing the safety-related system using hardware, such as a microprocessor and a PLC (Programmable Logic Controller), and a computer program (software). The use of techniques defined in IEC 61508 makes it possible to construct the safety-related system using a computer system.

Meanwhile, in recent years, the throughput of programmable electronic devices, such as a microprocessor, has been improved. Accordingly, various application programs are executed in parallel on a computer system by using a multitask OS (Operating System), thereby enabling integration of computer systems which are mounted in equipment, such as a service robot and a vehicle, for various purposes.

Patent Literature 1, for example, discloses a technique for causing an application program related to ensuring of functional safety (hereinafter, referred to as "safety-related application") to run on a computer system together with another application program (hereinafter, referred to as "non-safety-related application").

When the techniques defined in IEC 61508 are applied to the entire software including the safety-related application and the non-safety-related application, a need arises to apply the techniques also to the non-safety-related application. This causes a problem of an increase in software development cost.

Thus, in the technique disclosed in Patent Literature 1, safety-related applications (a safety monitoring program and a safety control program) are made independent from a non-safety-related application (a normal control program) by time partitioning of a system program. Accordingly, the normal control program can be excluded from the safety-related system, which contributes to a reduction in cost of the safety-related system constructed using a computer system.

Citation List

Patent Literature

[Patent Literature 1] Japanese Unexamined Patent Application Publication No. 2010-271759

SUMMARY OF INVENTION

Technical Problem

However, the safety controller exemplified in Patent Literature 1 has the following problems. The problems will be described below with reference to FIGS. 31 to 34.

A first problem will be first described. A control procedure for a service robot includes a number of processes required to be repeatedly executed in a constant cycle. Examples of the processes include a process for controlling an actuator of the service robot, and a process for acquiring information from a sensor of the service robot and checking the acquired information to thereby monitor the state of the service robot.

However, in a system program employing time partitioning as exemplified in Patent Literature 1, a time partition is forcibly switched in a constant cycle and an execution time of a processor is allocated to tasks belonging to the time partition. Accordingly, as shown in FIG. 31, when an execution cycle of each of tasks required to repeat processing in a constant cycle is designed to be asynchronous with a cycle of switching the time partition, there is a problem that jitter (deviation in cycle) occurs.

Note that FIG. 31 shows a case where a time partition TP3 to which a safety control task of a safety-related system belongs and a time partition TP2 to which a normal control task (not shown) belongs are scheduled. FIG. 31 also shows a case where the safety control task is the task which is required to repeat processing in the constant cycle. Thus, at a timing when the safety control task is subsequently executed after a lapse of the constant cycle since the execution of the safety control task, TP3 to which the safety control task belongs is not activated in some cases. In this case, there is a problem that the execution of the safety control task is delayed and the safety control task cannot be executed in the constant cycle.

Further, as shown in FIG. 32, even when the execution cycle of each of tasks is designed to be synchronized with the cycle of switching the time partition, the following problem arises. First, it is necessary to awaken the safety control task and bring the safety control task into the ready state during a period after the safety control task sleeps and comes into a waiting state after the execution of processing is finished, and before TP3 belonging to the next safety control task TP3 is activated. This is because even when the execution cycle of the safety control task is synchronized with the cycle of switching the time partition, if the execution of the safety control task is not started when the next TP3 is activated, the safety control task is not executed in the constant cycle.

In this case, as a method for awakening the safety control task, a method for awakening the safety control task by using the normal control task belonging to TP2 prior to TP3 may be employed. For example, the normal control task awakens the safety control task by means of an inter-task communication. In this case, however, there is a problem that the dependence of the safety control task of the safety-related system from the normal control task, which is a task other than safety control task, is not guaranteed.

Subsequently, a second problem will be described. As described above, a control procedure for a service robot includes a number of processes required to be repeatedly executed in a constant cycle. To repeatedly execute, in the constant cycle, a task for executing processing required to be repeated in the constant cycle, it is necessary that the execution of the task be finished within the constant cycle.

FIG. 33 shows a case where the time partition TP3 to which the safety control task of the safety-related system belongs and the time partition TP2 to which the normal control task (not shown) belongs are scheduled. In this case, the safety control task is the task required to repeat processing in the constant cycle, and TP3 is repeatedly activated in the same constant cycle. In FIG. 33, since the execution of the safety control task is not finished within the period of TP3 which is repeated in the constant cycle, the safety control task is not operating correctly in the constant cycle.

Here, in order to check whether the processing in the task is operating correctly in the constant cycle, it has been necessary to incorporate a mechanism for monitoring the execution of the processing in the constant cycle or monitoring the end of the processing in the constant cycle, in each software for generating tasks. In this case, there poses a problem that the processing contents in each software increase, with the result that the software is complicated.

Subsequently, a third problem will be described. In the time partitioning, as shown in FIG. 34, in order to reliably complete the execution of the task within the period of the time partition, the time of the time partition is set to be longer than the worst case of the execution time actually required. That is, the time of the time partition is set to be longer than the longest execution time for the task.

Thus, as shown in FIG. 34, when the task is finished before expiration of the execution time of the worst case, there is a problem in that the time partition includes a vacant time. That is, there is a problem that the execution time of the processor cannot be effectively used.

The present invention has been made based on the above findings, and has an object to provide a safety controller and a safety control method which are capable of executing tasks in a constant cycle while guaranteeing independence of a safety-related system in time partitioning.

Solution to Problem

A safety controller according to a first aspect of the present invention includes: a processor; a system program for controlling allocation of an execution time of the processor to a safety-related task for executing processing related to ensuring of functional safety of a control target, and to a non-safety-related task for executing other processing related to control of the control target; and a storage unit that stores end information indicating an end of processing in each of the tasks. The processor executes the system program to schedule the tasks in accordance with scheduling information indicating scheduling contents of a safety-related time partition in which the execution time is allocated to the safety-related task when the safety-related task is in a ready state, and of a non-safety-related time partition in which the execution time is allocated to the non-safety-related task when the non-safety-related task is in the ready state, so as to start a period of at least one of the safety-related time partition and the non-safety-related time partition in a constant cycle. The processor executes a task in a time partition in the constant cycle to store, upon completion of processing in the task, the end information indicating an end of the processing in the task into the storage unit, and releases the execution time for the task to bring the task into the ready state. The processor inhibits, in the scheduling, allocation of the execution time to the task in the time partition in the constant cycle in a case where the end information is stored in the storage unit, even when the task in the time partition in the constant cycle is in the ready state. The processor executes the system program to delete the end information stored in the storage unit during a period between an end of the period of the time partition in the constant cycle and a start of a period in a next cycle of the time partition.

A safety control method according to a second aspect of the present invention includes the steps of: scheduling a safety-related task for executing processing related to ensuring of functional safety of a control target, and a non-safety-related task for executing other processing related to control of the control target in accordance with scheduling information indicating scheduling contents of a safety-related time partition in which an execution time of a processor is allocated to the safety-related task when the safety-related task is in a ready state, and of a non-safety-related time partition in which the execution time is allocated to the non-safety-related task when the non-safety-related task is in the ready state, so as to start a period of at least one of the safety-related time partition and the non-safety-related time partition in a constant cycle, and allocating, in the time partition in the constant cycle, the execution time to the task in the time partition in the constant period; storing, upon completion of execution of processing in the task to which the execution time is allocated, end information indicating an end of the processing in the task, and releasing the execution time for the task to bring the task into the ready state; inhibiting allocation of the execution time to a task in a case where the end information is stored in the storage unit, even when the task in the time partition in the constant cycle is in the ready state, in the scheduling of the tasks in the time partition in the constant cycle; and deleting the end information stored in the storage unit during a period between an end of the period of the time partition in the constant cycle and a start of a period in a next cycle of the time partition.

Advantageous Effects of Invention

According to the above aspects of the present invention, it is possible to provide a safety controller and a safety control method which are capable of executing tasks in a constant cycle while guaranteeing independence of a safety-related system in time partitioning.

DESCRIPTION OF EMBODIMENTS

Figure 1:
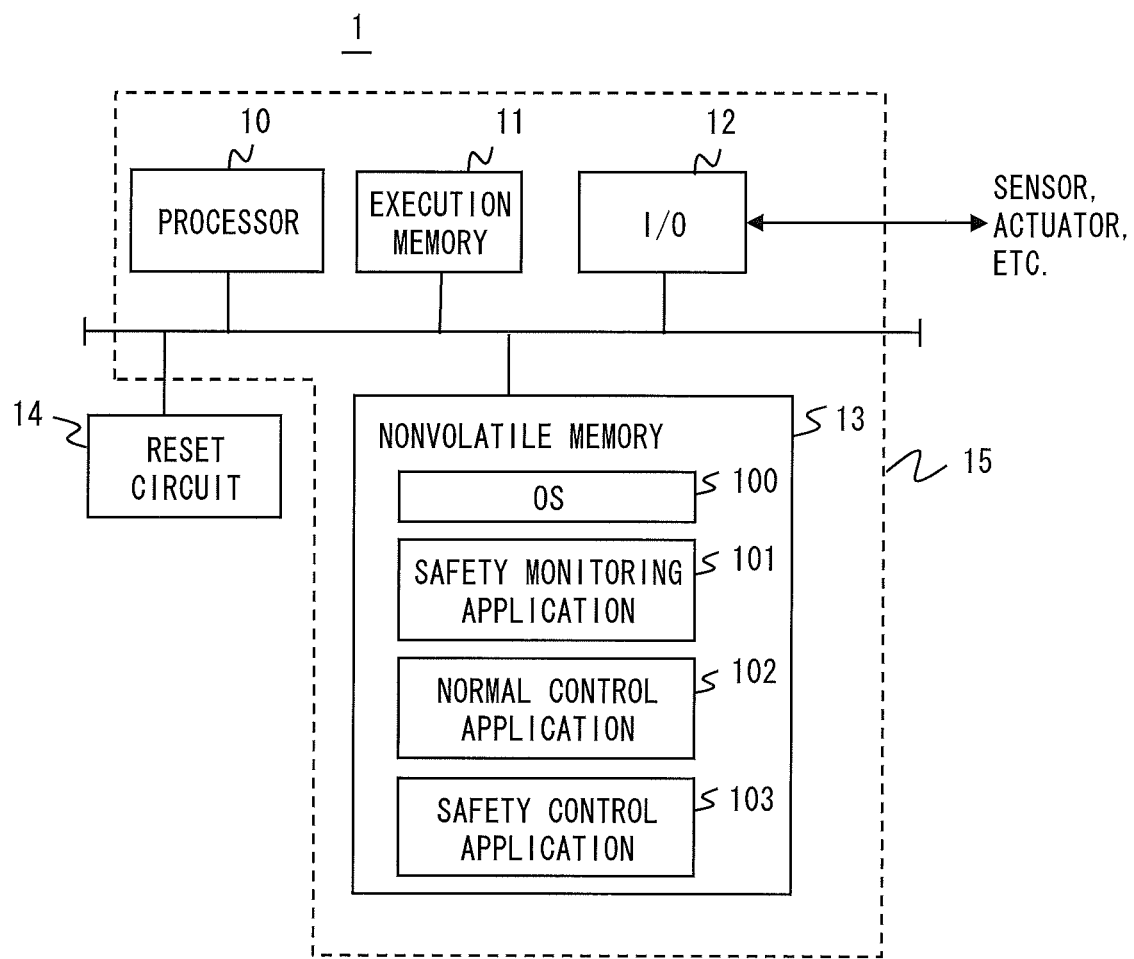
FIG. 1 is a block diagram showing a configuration example of a safety controller according to a first embodiment of the invention.

Exemplary embodiments of the present invention will be described in detail below with reference to the drawings. Throughout the drawings, the same components are denoted by the same reference numerals, and a repeated explanation thereof is omitted as needed for clarity of the explanation.

<First Embodiment of the Invention>

A safety controller 1 according to this embodiment is mounted in a service robot, transportation equipment, or the like and executes safety control for ensuring functional safety. The safety controller 1 is adapted to execute a safety-related application and a non-safety-related application in one computer system. FIG. 1 is a block diagram showing a configuration example of the safety controller 1 according to this embodiment.

A processor 10 fetches programs (instruction stream), decodes instructions, and carries out arithmetic processing according to the result of instruction decoding. Though only one processor 10 is illustrated in FIG. 1, the safety controller 1 may have a multiprocessor configuration including a plurality of processors 10. The processor 10 may be a multicore processor. The processor 10 executes an operating system (OS) 100 as a system program to thereby provide a multiprogramming environment. The multiprogramming environment means an environment in which a plurality of programs are assumed to be executed in parallel by periodically switching a plurality of programs to be executed or by switching programs to be executed upon generation of an event.

Multiprogramming is sometimes called a multiprocess, multithread, multitask, or the like. Each of a process, a thread, and a task indicates a program unit to be executed in parallel in the multiprogramming environment. The multiprogramming environment included in the processor 10 according to this embodiment may be a multiprocess environment or a multithread environment.

An execution memory 11 is a memory used for the processor 10 to execute programs. The execution memory 11 stores programs (an OS 100, applications 101 to 103, etc.), which are loaded from a nonvolatile memory 13, input and output data to and from the processor 10, and the like. Note that the processor 10 may directly execute these programs from the nonvolatile memory 13 without loading the programs from the nonvolatile memory 13 into the execution memory 11.

Specifically, the execution memory 11 may be a randomly accessible volatile memory such as an SRAM (Static Random Access Memory) or a DRAM (Dynamic Random Access Memory). The execution memory 11 of FIG. 1 shows logical units. That is, the execution memory 11 may be implemented as a combination of a plurality of SRAM devices, a combination of a plurality of DRAM devices, or a combination of an SRAM device and a DRAM device, for example.

An I/O port 12 is used for data transmission and reception to and from external devices. When the safety controller 1 is mounted in a service robot, for example, the external devices are a visual sensor capable of measuring obstacles around the service robot, an actuator for causing the service robot to operate, and the like.

The nonvolatile memory 13 is a memory device capable of maintaining storage contents more stably than the execution memory 11 without being supplied with power. The nonvolatile memory 13 is, for example, a ROM (Read Only Memory), a flash memory, a hard disk drive, an optical disk drive, or a combination thereof. The nonvolatile memory 13 stores the OS 100 and the applications 101 to 103. Note that at least a part of the nonvolatile memory 13 may be configured to be removable from the safety controller 1. For example, the memory storing the applications 101 to 103 may be removably mounted. Alternatively, at least a part of the nonvolatile memory 13 may be disposed outside the safety controller 1.

The OS 100 is executed by the processor 10 so as to perform task management including task scheduling, interrupt management, time management, and resource management, and to provide a mechanism for inter-task synchronization and inter-task communication, for example, by using hardware resources such as the processor 10, the execution memory 11, and the nonvolatile memory 13.

In addition, the OS 100 has a function of protecting hardware resources temporally and spatially in order to increase the independence of the safety monitoring application 101 and the safety control application 103, which are related to ensuring of functional safety, from the normal control application 102. Here, the hardware resources include the processor 10, the execution memory 11, and the I/O port 12.

Out of these, temporal protection is performed by partitioning a temporal resource such as an execution time of the processor 10. Specifically, the temporal protection is performed by partitioning the execution time of the processor 10 and allocating a task (a process or a thread) to each partition (referred to as "time partition"). A scheduling function (partition scheduler 21) of the OS 100 provides a guarantee of use of resources, including the execution time of the processor 10, to the task allocated to each time partition (hereinafter, abbreviated as "TP" in some cases).

Figure 2:
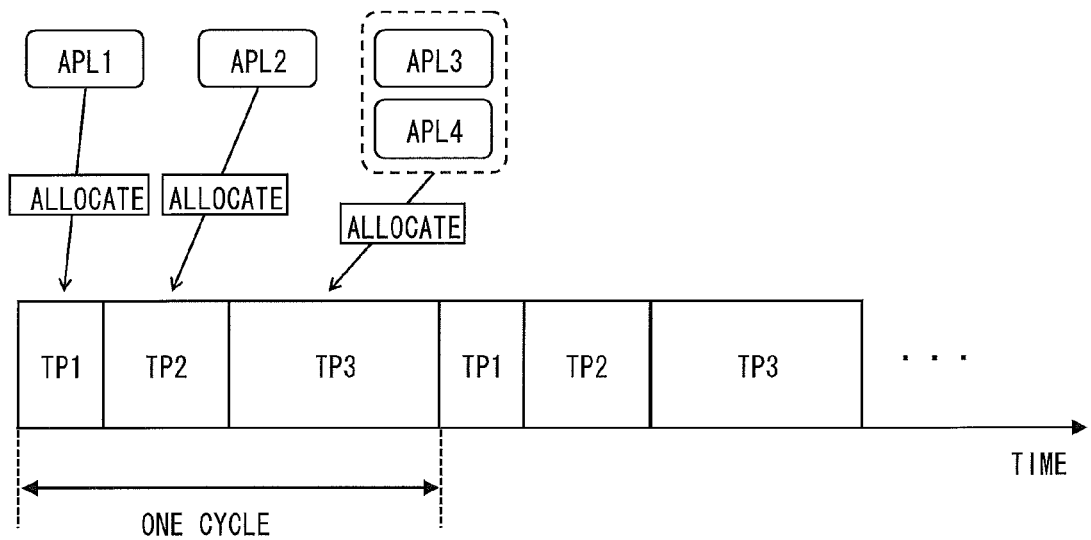
FIG. 2 is a diagram for explaining the concept of time partitioning according to the first embodiment of the invention.

FIG. 2 is a conceptual diagram relating to the time partitioning. FIG. 2 shows an example in which a predetermined one-cycle time is divided into three time partitions of TP1, TP2, and TP3. Assuming that the one-cycle time is 100 ticks, the first 20 ticks are defined as TP1, the middle 30 ticks are defined as TP2, and the last 50 ticks are defined as TP3.

In the example shown in FIG. 2, a first application (APL1) to a fourth application (APL4) are allocated to any of TP1 to TP3. The scheduling function (partition scheduler 21) of the OS 100 selects and decides one of TP1 to TP3 to be activated according to a lapse of time. Then, the application allocated to the active TP is executed by the processor 10.

Meanwhile, spatial protection is performed by partitioning stationary resources, including the execution memory 11 and the I/O port 12, and by allocating a task to each partition (referred to as "resource partition"). The scheduling function (partition scheduler 21) of the OS 100 inhibits the task from exceeding the resource partition preliminarily allocated (hereinafter, abbreviated as "RP" in some cases) and from accessing other resources.

Figure 3:
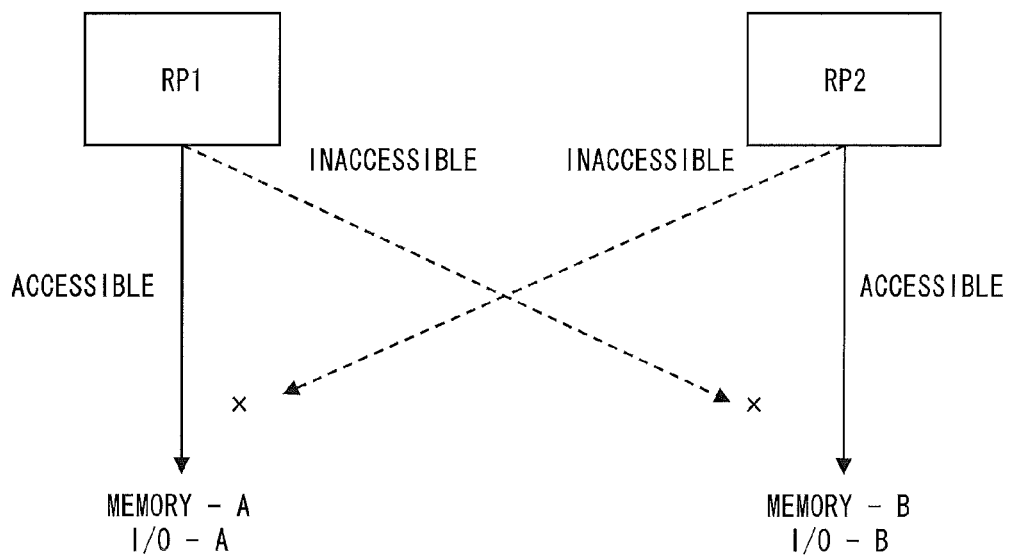
FIG. 3 is a conceptual diagram for explaining the concept of resource partitioning according to the first embodiment of the invention.

FIG. 3 is a conceptual diagram relating to the resource partitioning. The example of FIG. 3 shows two RPs (RP1 and RP2). A part (A area) of each of the nonvolatile memory 13 and the execution memory 11 and a part (port A) of the I/O port 12 are allocated to RP1. Further, another part (B area) of each of the execution memory 11 and the nonvolatile memory 13 and another part (port B) of the I/O port 12 are allocated to RP2. Access from RP1 to the resources allocated to RP2 is inhibited, and access from RP2 to the resources allocated to RP1 is inhibited.

Note that there is no need to exclusively allocate all the resources to any one of RPs. That is, the resources may be shared by a plurality of RPs. For example, in the case of performing safety control of a service robot, it is necessary for the actuator to be accessible from both the normal control application 102 and the safety control application 103. Accordingly, the I/O port for controlling the actuator may be shared by the RP to which the normal control application 101 belongs and the RP to which the safety control application 102 belongs.

Returning to FIG. 1, description will be continued. The applications 101 to 103 are executed in the multiprogramming environment provided by the OS 100 and the processor 10. Among these applications, the safety monitoring application 101 includes instruction code for causing the processor 10 to execute monitoring of the running status of the normal control application 102, monitoring of the running status of the safety control application 103, and monitoring of the input and output data to and from the I/O port 12. The safety monitoring application 101 also includes instruction code for causing the processor 10 to execute notification of a result to the partition scheduler 21. That is, the safety monitoring application 101 is a safety-related application.

Further, the normal control application 102 includes instruction code for causing the processor 10 to execute a control procedure to cause a control target, such as a service robot, to execute a normal function/operation. The normal control application 102 also includes instruction code for causing the processor 10 to execute notification of the result to the partition scheduler 21. That is, the normal control application 102 is a non-safety-related application.

Furthermore, the safety control application 103 includes instruction code for causing the processor 10 to execute a control procedure prescribed to ensure functional safety in a case where some abnormality is detected. The safety control application 103 also includes instruction code for causing the processor 10 to execute notification of the result to the partition scheduler 21. That is, the safety control application 103 is a safety-related application.

A reset circuit 14 resets a microcontroller 15 based on a signal from the OS 100. The mechanism for resetting the microcontroller 15 using the reset circuit 14 will be described later.

Figure 4:
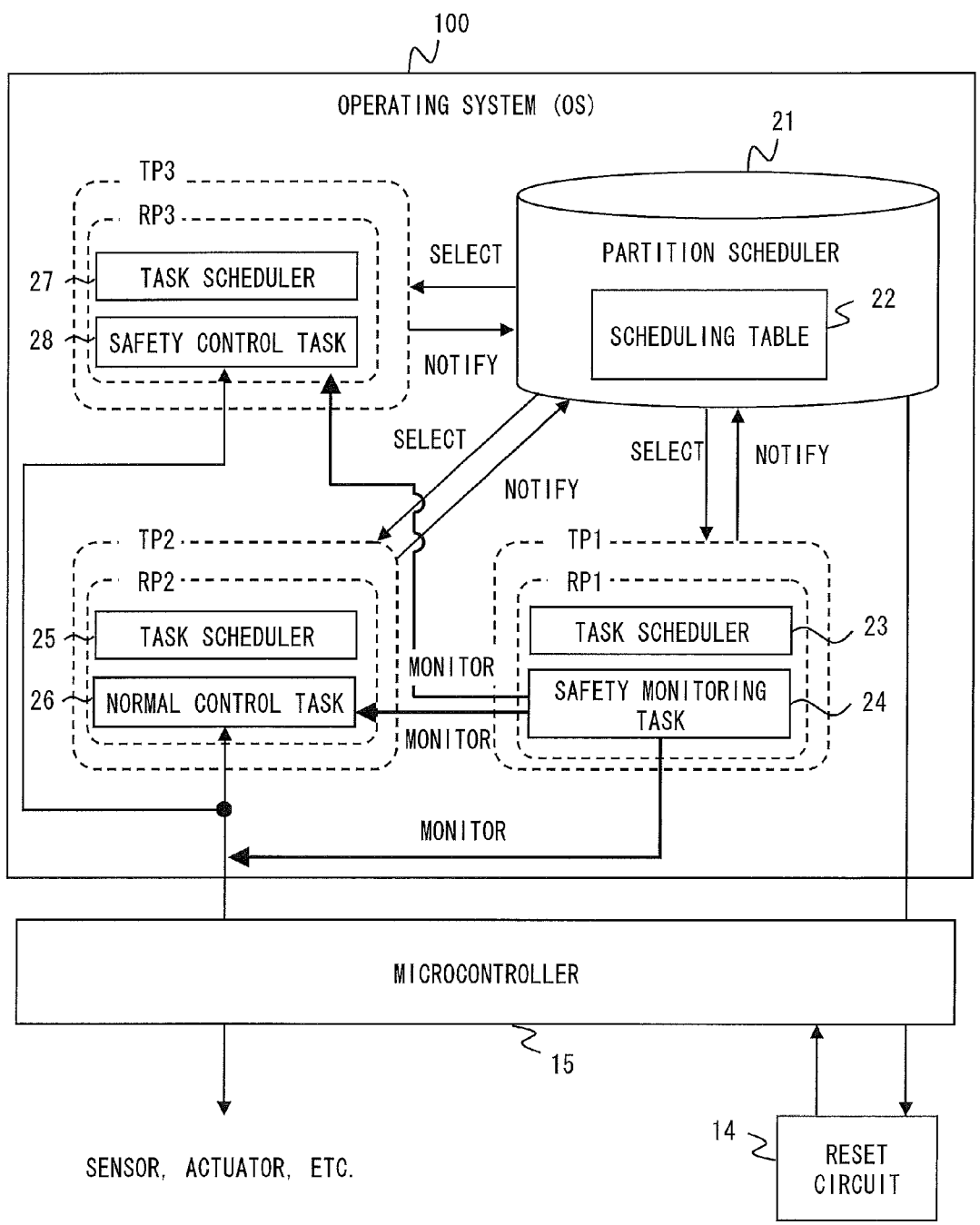
FIG. 4 is a diagram showing relationships between a partition scheduler and tasks which are activated in an execution environment provided by an OS shown in FIG. 1.

Subsequently, relationships between the partition scheduler 21 and tasks generated upon activation of the applications 101 to 103 will be described with reference to FIG. 4. FIG. 4 is a diagram showing the relationships between the partition scheduler 21 and tasks 24, 26, and 28 which are activated in the multiprogramming environment provided by the OS 100.

The microcontroller 15 includes the processor 10, the execution memory 11, the I/O port 12, and the nonvolatile memory 13. While FIG. 4 illustrates a configuration in which the reset circuit 14 is provided outside the microcontroller 15, a configuration in which the reset circuit 14 is included in the microcontroller 15 may also be employed.

The microcontroller 15 is supplied with a clock signal from an external clock source, and the processor 10 and the like operate in a predetermined timer period based on the clock signal. This embodiment is described assuming that the predetermined timer period is one tick. Accordingly, when the OS 100 is executed by the processor 10, the partition scheduler 21 operates every one tick. In the TPs, task schedulers 23, 25, and 27 and the tasks (the safety monitoring task 24, the normal control task 26, and the safety control task 28) operate every one tick.

The partition scheduler 21 operates every one tick and switches the TP (partition scheduling). The partition scheduler 21 selects and decides one of TP1 to TP3 to be activated in the next one tick. Further, the partition scheduler 21 starts operation of the task scheduler on the selected TP.

Specifically, the partition scheduling is performed by the partition scheduler 21 in such a manner that the partition scheduler 21 refers to a scheduling table 22 to perform the partition scheduling in accordance with a scheduling pattern defining a setting of each TP.

The scheduling table 22 retains scheduling patterns each defining a switching order and a timing of each TP. Note that the scheduling table 22 holds at least two different scheduling patterns. One is a scheduling pattern applied when abnormality detection is not performed by the safety monitoring task 24 (i.e., during normal time). The other is a scheduling pattern applied when an abnormality is detected by the safety monitoring task 24. Hereinafter, the scheduling pattern applied during normal time is called a "normal control scheduling pattern", and the scheduling pattern applied upon detection of an abnormality is called a "safety control scheduling pattern".

Figure 5A:
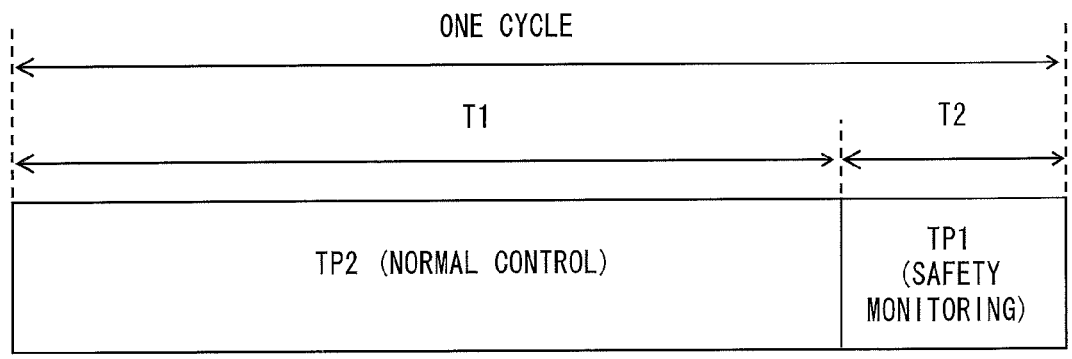
FIG. 5A is a diagram showing a specific example of a scheduling pattern.

FIG. 5A shows a specific example of the normal control scheduling pattern. In FIG. 5A, TP2 to which the normal control task 26 belongs is allocated to the first half (T1) of the one-cycle time. Further, TP1 to which the safety monitoring task 24 belongs is allocated to the latter half (T2) of the one-cycle time. According to the scheduling pattern shown in FIG. 5A, the normal control task 26 and the safety monitoring task 24 are repeatedly scheduled.

Figure 5B:
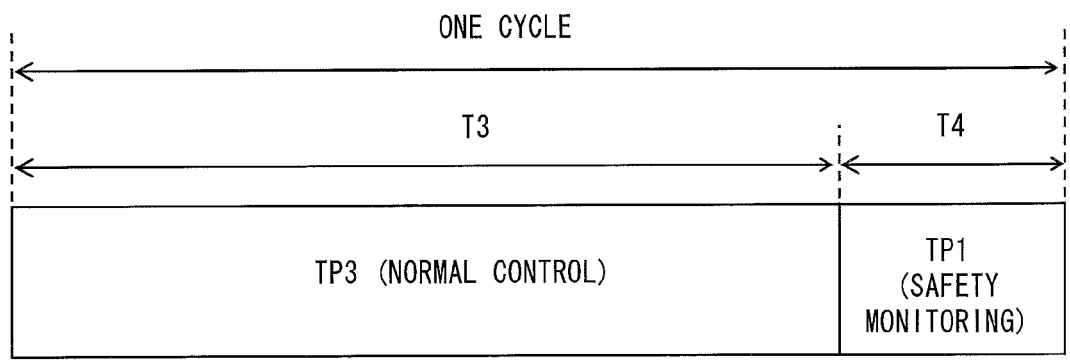
FIG. 5B is a diagram showing a specific example of the scheduling pattern.

FIG. 5B shows a specific example of the safety control scheduling pattern. In FIG. 5B, TP3 to which the safety control task 28 belongs is allocated to the first half (T3) of the one-cycle time. Further, TP1 to which the safety monitoring task 24 belongs is allocated to the latter half (T4) of the one-cycle time. According to the scheduling pattern shown in FIG. 5B, the safety control task 28 and the safety monitoring task 24 are repeatedly scheduled.

Returning to FIG. 4, the description will be continued. The task schedulers 23, 25, and 27 schedule the tasks in the TPs to which the task schedulers respectively belong. Typical scheduling based on priorities may be applied to the scheduling of the tasks in the TPs. Note that FIG. 4 illustrates that each TP includes only one task, but in practice, each TP includes one or more tasks. For example, TP2 for normal control may include two tasks: a normal control task A and a normal control task B.

The safety monitoring task 24 is a task generated upon activation of the safety monitoring application 101. In the example shown in FIG. 4, the safety monitoring task 24 is allocated to TP1 and RP1. The safety monitoring task 24 monitors the running status of the normal control task 26, which is a non-safety-related application, monitors the safety control task 28, which is a safety-related application, and monitors the input and output data to and from the I/O port 12. Furthermore, the safety monitoring task 24 notifies the partition scheduler 21 of the running status of the task.

The normal control task 26 is a task generated upon activation of the normal control application 102. In the example shown in FIG. 4, the normal control task 26 is allocated to TP2 and RP2. The normal control task 26 performs a control procedure for causing a control target, such as a service robot, to execute a normal function/operation. Furthermore, the normal control task 26 notifies the partition scheduler 21 of the running status of the task.

The safety control task 28 is a task generated upon activation of the safety control application 103. In the example shown in FIG. 4, the safety control task 28 is allocated to TP3 and RP3. The safety control task 28 performs a control procedure prescribed to ensure functional safety in a case where some abnormality is detected. Furthermore, the safety control task 28 notifies the partition scheduler 21 of the running status of the task. Note that various techniques may be employed as a specific configuration for notifying the results from each task to the partition 21. For example, a task may invoke a system call (service call) of the OS 100, and results may be notified to the partition scheduler 21 through the OS 100. Alternatively, assuming that a flag related to the running status of a task is stored in the execution memory 11, the task may set the value of the flag according to the running status of the task, and the partition scheduler 21 may judge the running status of the task according to the set value of the flag.

As described above, the partition scheduler 21 operates every one tick to select and decide one of TP1 to TP3 to be activated. Further, the partition scheduler 21 starts operation of the task scheduler on the selected TP. Then, when the task schedulers 23, 25, and 27 start operation, the task scheduling is carried out, and the processor 10 executes the tasks in the TP in the order of the tasks scheduled by the task schedulers 23, 25, and 27. Thus, the application allocated to the active TP is executed by the processor 10.

Figure 6:
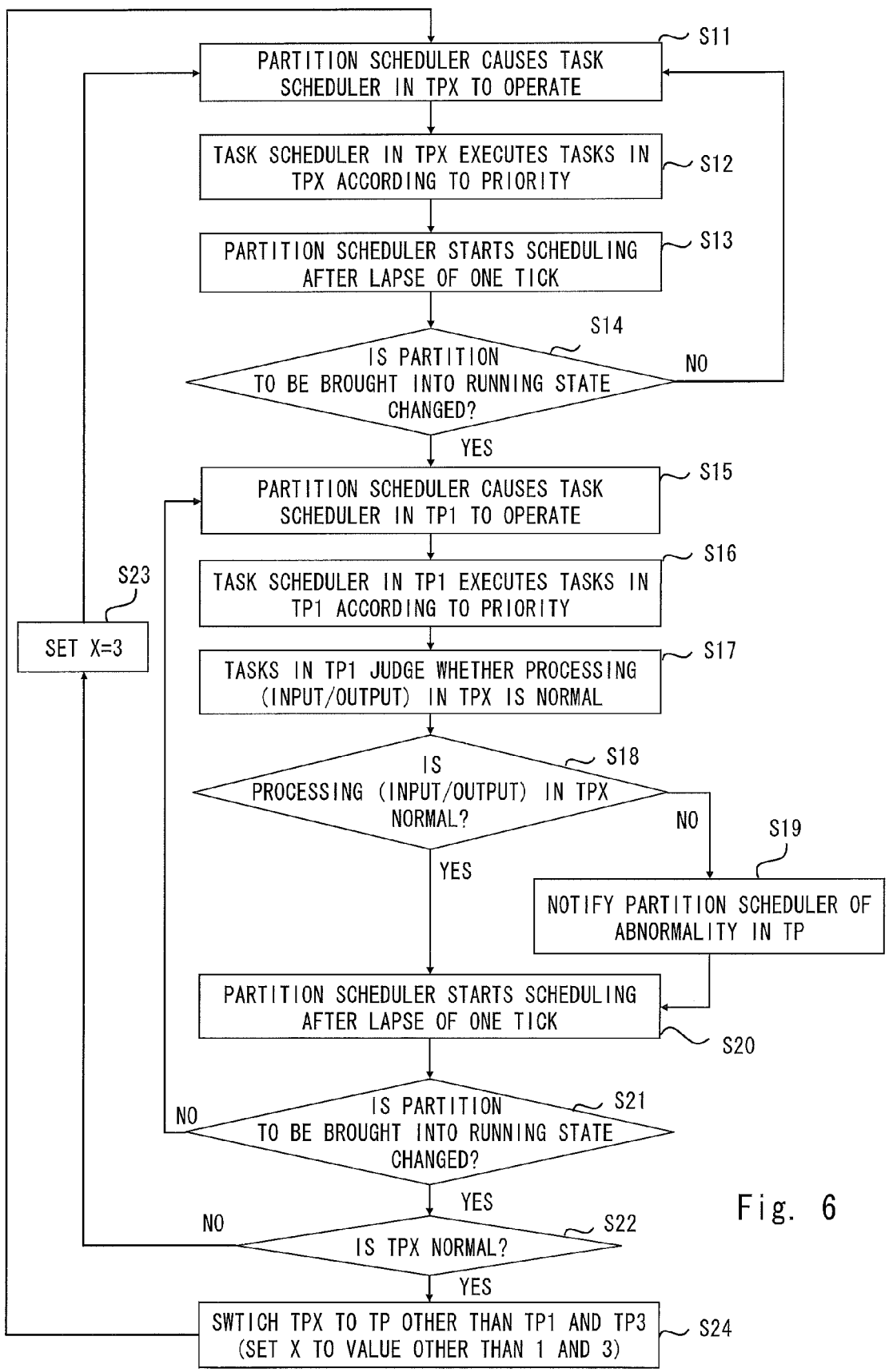
FIG. 6 is a flowchart showing a specific example of a procedure of a partition scheduler.

Subsequently, the partition scheduling performed by the partition scheduler 21 will be described with reference to FIG. 6. FIG. 6 is a flowchart showing a specific example of the procedure of the partition scheduler 21.

First, the partitioning scheduler 21, which operates every one tick, causes the task scheduler in TPX to operate (S11). Here, a variable X represents a TP number, and X is a value other than 1. Specifically, in S11, one of TP2 and TP3, excluding TP1 for safety monitoring, is caused to operate.

Referring to FIG. 6, a case is described by way of example in which the scheduling is executed in accordance with the normal control scheduling pattern (for example, FIG. 5A) or the safety control scheduling pattern (for example, FIG. 5B). In other words, a case is described by way of example in which when TP1 is a TP subsequent to TP2 or TP3 and when an abnormality of TP2 is detected in TP1, TP3 is a TP subsequently selected and decided upon reception of the result from TP1.

The task scheduler in TPX having started operation in S11 executes tasks in TPX according to priority (S12). After a lapse of one tick, the partition scheduler 21 starts scheduling of TPs (S13). Specifically, the partition scheduler 21 selects and decides one of TPs to be activated in the next one tick in accordance with the scheduling pattern.

When the TP to be subsequently activated is not changed (No in S14), the partition scheduler 21 returns to S11 to continue operation on the same TPX. Accordingly, before the timing when TPX is switched, the processing of S11 to S14 is repeated.

When the TP to be subsequently activated is changed (Yes in S14), the partition scheduler 21 causes the task scheduler in the time partition to be changed to operate (S15). Here, the task scheduler in TP1 is caused to operate. Then, the task scheduler 23 in TP1 executes the tasks in TP1 according to priority (S16).

The safety monitoring task 24 executed in TP1 monitors the running status of the normal control task 26 and monitors the input and output data to and from the I/O port 12, to thereby judge whether these are normal (S17). As a result of the judgment, when it is judged that they are abnormal (No in S18), the safety monitoring task 24 notifies the partition scheduler 21 of the result (S19).

After a lapse of one tick, the partition scheduler 21 resumes scheduling (S20). The partition scheduler 21 selects and decides which TP is to be activated in the next one tick in accordance with the scheduling pattern. When the TP to be subsequently activated is not changed (No in S21), the flow returns to S15 to continue the operation on TP1.

When the TP to be subsequently activated is changed (Yes in S21), the partition scheduler 21 further judges whether TPX has been normal according to the result notified from TP1 in S19 (S22). As a result of the judgment, when it has been abnormal (No in S22), the partition scheduler 21 selects and decides TP3 as the TP to be activated in the next one tick (S23).

As a result of the judgment, when it has been normal (Yes in S22), the partition scheduler 21 selects and decides TPX other than TP1 and TP3 as the TP to be activated in the next one tick (S24).

As for the processing shown in FIG. 6, a specific example of the partition scheduling will be described.

First, a case will be described in which scheduling is started in S11 in accordance with the normal control scheduling pattern illustrated in FIG. 5A. In this case, the scheduling is started in S11 assuming that TPX=TP2, and TPX=TP2 is maintained during the processing of S12 to S14. Then, TPX is changed from TP2 to TP1 in S15, and TP1 remains unchanged during the processing of S15 to S21. When it is determined that the running status (data input and output) related to TP2 is normal in S18, TPX=TP2 holds in S24 (that is, the normal control scheduling pattern starting from TP2 is continued). Meanwhile, when it is determined that the running status (data input and output) related to TP2 is abnormal in S18, TPX=TP3 holds in S23 (that is, the scheduling pattern is switched to the safety control scheduling pattern starting from TP3).

Further, a case will be described in which scheduling is started in S11 in accordance with the safety control scheduling pattern illustrated in FIG. 5B. In this case, the scheduling is started assuming that TPX=TP3 in S11, and TPX=TP3 is maintained during the processing of S12 to S14. Then, TPX is changed from TP3 to TP1 in S15, and TP1 remains unchanged during the processing of S15 to S21. When it is determined that the running status (data input and output) related to TP3 is normal in S18, TPX=TP2 holds (that is, the scheduling pattern is switched to the normal control scheduling pattern starting from TP2) in S24. Meanwhile, when it is determined that the running status (data input and output) related to TP3 is abnormal in S18, TPX=TP3 holds (that is, the safety control scheduling pattern starting from TP3 is continued) in S23.

The above example illustrates the case where only the three TPs (TP1 for safety monitoring, TP2 for normal control, and TP3 for safety control) are combined as the scheduling pattern, but a plurality of partitions TP2 for normal control and a plurality of partitions TP3 for safety control may be present. For example, scheduling patterns may be formed by a combination of five TPs (TP1 to TP5) including two TPs of TP2 and TP4 for normal control, TP1 for safety monitoring, and two TPs of TP3 and TP5 for safety control. In this case, in S23, the partition scheduler 21 may determine the type of the abnormality state of the running status (data input and output) related to TPX, and may select one of TP3 and TP5 for safety control according to the abnormality type. Further, in S24, one of TP2 and TP4 for normal control may be selected.

As described above, in this embodiment, the OS 100 includes the partition scheduler 21 for selecting and deciding a partition to be subsequently activated in response to the notification from TP1 for safety monitoring or the notification from each TP. The partition scheduler 21 operates in the predetermined timer period independently from the tasks executed in each TP. The partition scheduler 21 which operates independently in the predetermined timer period includes a partition scheduling function, which provides the following effects.

First, in general, there is a demand for shortening the execution time of the safety monitoring task 24 as much as possible in order to sufficiently ensure the execution time of the normal control task 26. In a related art (for example, Patent Literature 1), the safety monitoring task 24 performs not only monitoring of the running status of the normal control task 26 and monitoring of the input and output data to and from the I/O port 12, but also selection and decision of the scheduling pattern. Therefore, it is necessary to allocate the execution time required for the selection and decision to TP2 to which the safety monitoring task 24 belongs.

In order to guarantee the ensuring of functional safety, it is basically necessary to alternately execute the safety monitoring task 24 and the normal control task 26. For this reason, in the related art, the selection and decision of the scheduling pattern by the safety monitoring task 24 are also executed each time upon execution of the normal control task 26. After a plurality of cycles in total, a lot of execution time is required for the safety monitoring task 24 to select and decide the scheduling pattern.

On the other hand, according to this embodiment, it is not necessary for the safety monitoring task 24 itself to execute selection and decision of the scheduling pattern. Additionally, the execution time required for the partition scheduler 21 to select and decide the scheduling pattern is shortened. This provides an effect that a shorter period of time can be allocated to TP1 for safety monitoring and a longer period of time can be allocated to TP2 for normal control, as compared with the related art.

Furthermore, the processing illustrated in FIG. 6 has been described assuming that the partition scheduler 21 selects and decides TP3 for safety control (S23), or selects and decides TP2 for normal control (S24), according to the result notified from TP1, but the present invention is not limited thereto. For example, a configuration in which the running status is notified to the partition scheduler 21 from each of TP1 to TP3 may be employed in place of the configuration in which the result is notified to the partition scheduler 21 only from TP1 for safety monitoring, and the partition scheduler 21 may select and decide TP3 for safety control according to the result notified from each TP.

When the partition scheduler 21 which operates independently is adapted to receive the notification of results from all TPs, the partition scheduler 21 can grasp the statuses related to all TPs in an integrated manner. Accordingly, when the partition scheduler 21 decides and selects the next partition in response to the notification of the result from TP1 for safety monitoring, for example, the partition scheduler 21 can decide and select the next partition only based on TPs in the normal state in consideration of the status of each TP. This provides an effect that more accurate partition scheduling can be achieved as compared with the related art.

Figure 7:
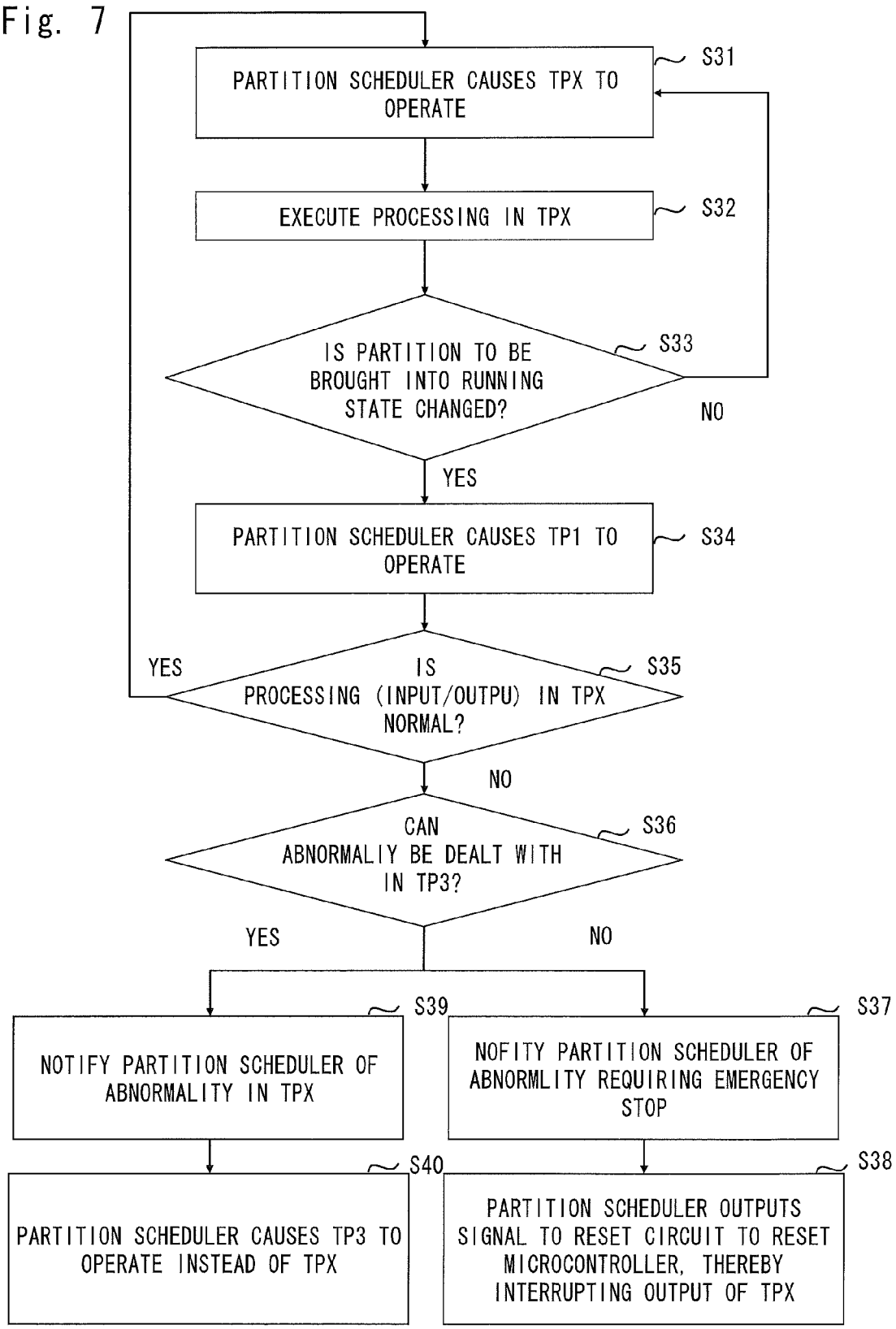
FIG. 7 is a flowchart showing a specific example of a reset procedure of a microcontroller.
Figure 8:
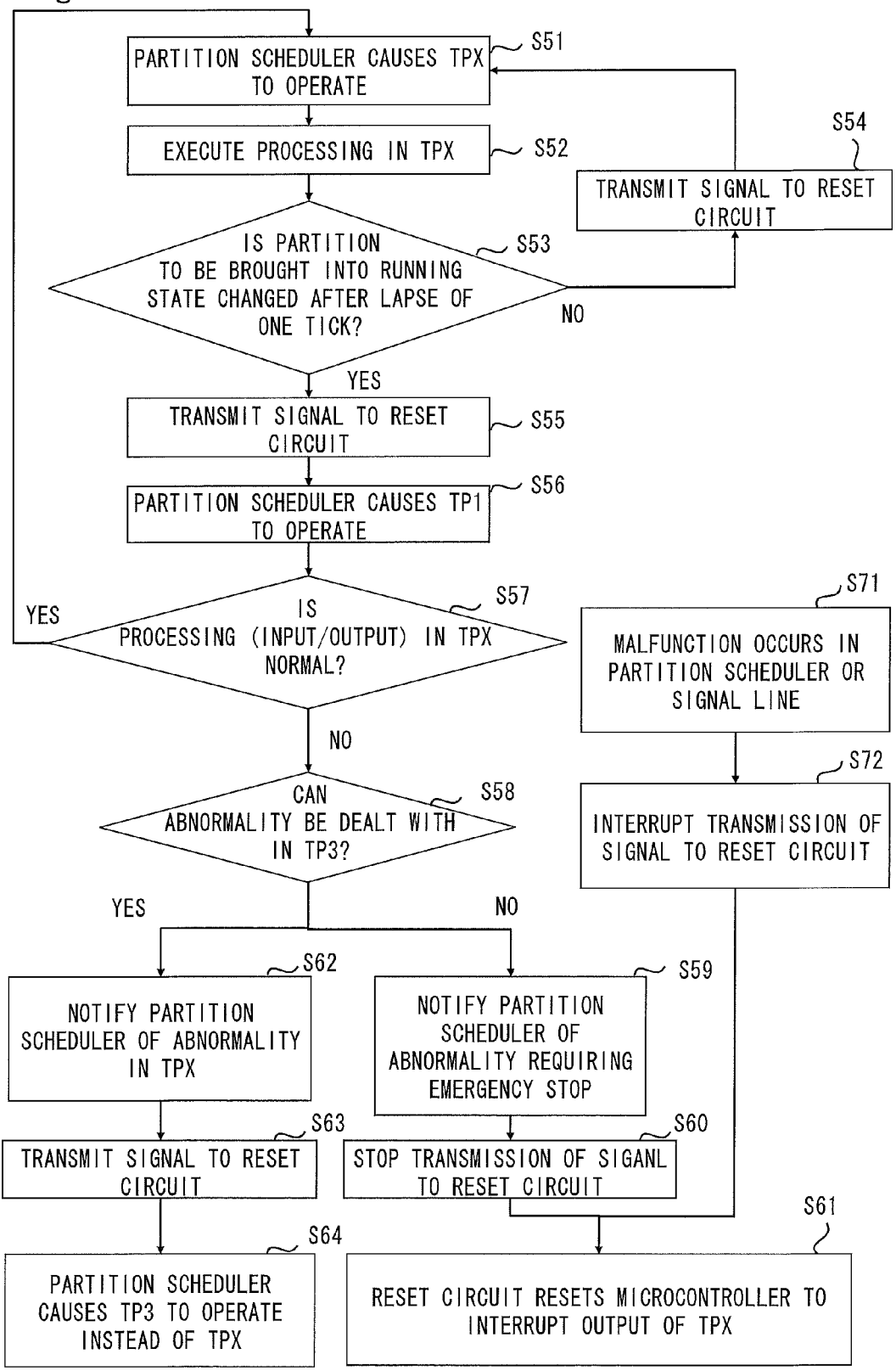
FIG. 8 is a flowchart showing a specific example of the reset procedure of the microcontroller.

Subsequently, the mechanism for resetting the microcontroller 15 using the reset circuit 14 will be described with reference to FIGS. 7 and 8. FIGS. 7 and 8 are flowcharts each showing a specific example of the reset procedure of the microcontroller 15 using the reset circuit 14.

In this embodiment, the partition scheduler 21 which operates every one tick has a function of resetting the microcontroller 15. Upon detecting an abnormality in the OS 100, the partition scheduler 21 takes a measure for the abnormality in conjunction with the reset circuit 14. The reset circuit 14 resets the microcontroller 15 based on the signal from the partition scheduler 21.

Referring first to FIG. 7, a specific example of the reset procedure of the microcontroller 15 using the reset circuit 14 will be described. In the processing shown in FIG. 7, upon receiving a reset instruction signal from the partition scheduler 21, the reset circuit 14 resets the microcontroller 15. Note that in FIG. 7, TPX is a TP other than TP1 and TP3.

First, in S31 to S33, the partition scheduler 21 starts operation of TPX, thereby executing processing related to TPX until the TP to be subsequently activated is changed. After the partition scheduler 21 starts operation of the task scheduler 23 in TP1 (S34), the safety monitoring task 24 belonging to TP1 judges whether the processing (input and output) related to TPX has been normal (S35). As a result of the judgment, when the processing has been normal (Yes in S35), the flow returns to S31 to continue the operation for the same TPX.

As a result of the judgment, when the processing has been abnormal (No in S35), the safety monitoring task 24 belonging to TP1 judges whether the abnormality in TPX is an abnormality that can be dealt with by the safety control task 28 belonging to TP3 (S36). When the abnormality is not an abnormality that can be dealt with in TP3 (No in S36), the safety monitoring task 24 belonging to TP1 notifies the partition scheduler 21 of the abnormality requiring emergency stop (S37). The partition scheduler 21 having received the notification from the safety monitoring task 24 belonging to TP1 outputs a reset instruction signal to the reset circuit 14, and the reset circuit 14 having received the reset instruction signal resets the microcontroller 15 (S38).

When the abnormality is an abnormality that can be dealt with in TP3 (Yes in S36), the safety monitoring task 24 belonging to TP1 notifies the partition scheduler 21 of the abnormality in TPX (S39). The partition scheduler 21 having received the notification from TP1 switches the time partition from TPX to TP3 (S40).

Referring next to FIG. 8, another specific example of the reset procedure of the microcontroller 15 using the reset circuit 14 will be described. In the processing shown in FIG. 8, the partition scheduler 21 periodically transmits signals to the reset circuit 14. Further, when the transmission of signals from the partition scheduler 21 is interrupted, the reset circuit 14 resets the microcontroller 15. Note that in FIG. 8, TPX is a TP other than TP1 and TP3.

In comparison with the processing of S31 to S35 shown in FIG. 7, it is clarified in S53 of FIG. 8 that the partition scheduler 21 operates every one tick, and there is a difference in that the partition scheduler 21 periodically transmits signals to the reset circuit 14 in S54 and S55. The other processing of S51 to S57 shown in FIG. 8 is basically the same as that of S31 to S35 shown in FIG. 7.

Further, in comparison with the processing of S36 to S40 shown in FIG. 7, there is a difference in that the partition scheduler 21 stops transmission of signals to the reset circuit 14 in S60 of FIG. 8, and that the partition scheduler 21 transmits signals to the reset circuit 14 in S63. There is another difference in that, in S61 of FIG. 8, the reset circuit 14 resets the microcontroller 15 upon interruption of the transmission of signals from the partition scheduler 21. The other processing of S58 to S64 shown in FIG. 8 is basically the same as that from S36 to S40 shown in FIG. 7.

Moreover, as shown in S71 and S72 of FIG. 8, when a malfunction occurs in the partition scheduler 21, or when a malfunction occurs in a signal line from the partition scheduler 21 to the reset circuit 14, in parallel with the processing of S51 to S64, the transmission of signals from the partition scheduler 21 to the reset circuit 14 is interrupted. Also in this case, the reset circuit 14 resets the microcontroller 15 upon interruption of the transmission of signals from the partition scheduler 21 (S61).

According to the processing shown in FIG. 8, the microcontroller 15 can be reliably reset not only when the reset instruction is intentionally issued from the partition scheduler 21 to the reset circuit 14, but also when the partition scheduler 21 itself fails to operate normally due to some causes or when a malfunction occurs in a signal line for transmitting signals from the partition scheduler 21 to the reset circuit 14. At the same time, execution of normal switching of TPs every one tick can also be guaranteed.

Note that in FIGS. 7 and 8, the description has been made assuming that the partition scheduler 21 outputs the reset instruction signal to the reset circuit 14 or stops transmission of the signal to the reset circuit 14 in response to the notification of the result from TP1. Alternatively, the partition scheduler 21 may output the reset instruction signal to the reset circuit 14 or stop transmission of the signal to the reset circuit 14 in response to the notification of the result from any one of TP1 to TP3.

<Second Embodiment of the Invention>

Subsequently, the safety controller 1 according to a second embodiment of the invention will be described. Note that the configuration of the safety controller 1 according to the second embodiment is similar to that of the safety controller 1 according to the first embodiment. Also the relationships between the partition scheduler 21 and the tasks 24, 26, and 28 are similar to those of the configuration of the safety controller 1 according to the first embodiment. Hereinafter, description of the same contents as those of the safety controller 1 according to the first embodiment is omitted.

In the second embodiment, a task for executing the processing required to be executed in a constant cycle notifies the partition scheduler 21 that the processing is finished, when the processing of the task is finished. In the second embodiment, a case is described in which the safety control task 28 is a task for executing the processing required to be executed in a constant cycle.

When the safety control task 28 has finished execution of the processing, information indicating an end of the processing in TP3 is stored in the execution memory 11. Specifically, the execution memory 11 stores a TP processing end flag indicating whether the processing in TP3 has been finished or not. The safety control task 28 sets the TP processing end flag when the processing is finished. That is, when the TP processing end flag is set, the TP processing end flag indicates that the execution of the safety control task 28 is finished and that the processing of the safety control task 28 is finished. When the TP processing end flag is not set, the TP processing end flag indicates that the execution of the safety control task 28 is not finished and that the processing of the safety control task 28 is not finished. The safety control task 28 causes the task scheduler 27 to operate after setting the TP processing end flag. That is, the safety control task 28 releases the execution time of the processor 10 to transit to a ready state after setting the TP processing end flag. Note that the states of tasks, such as the ready state, will be described later.

The task scheduler 27 performs scheduling of tasks belonging to TP3, but when the TP processing end flag is set, the task scheduler 27 inhibits allocation of the execution time of the processor 10 to the safety control task 28 even if the safety control task 28 is in the ready state.

The partition scheduler 21 clears the TP processing end flag when the TP is switched. In the second embodiment, a case is described in which the partition scheduler 21 performs the partition scheduling in accordance with the scheduling pattern illustrated in FIG. 8. That is, the scheduling table 22 holds the scheduling pattern illustrated in FIG. 9. The scheduling pattern illustrated in FIG. 9 defines the switching order and timing of TPs so that TP3 is activated in a constant cycle.

Figure 11:
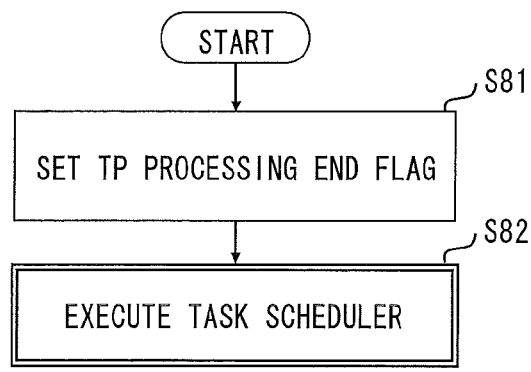
FIG. 11 is a flowchart showing a specific example of a termination procedure for a safety control task according to the second embodiment of the invention.

Referring next to FIG. 11, states of the tasks will be described. FIG. 11 is a task state transition diagram. Each of the tasks 24, 26, and 28 takes one of a running state, a ready state, a waiting state, a waiting-suspended state, a suspended state, and a dormant state.

The running state is a state in which the execution time of the processor 10 is allocated to tasks by the task schedulers 23, 25, 27, and 29. When a task is in the running state, the task is being executed by the processor 10. When the execution time of the processor 10, which is allocated by the task schedulers 23, 25, 27, and 29, is used up, for example, a task in the running state transits to the ready state. Further, when the task in the running state goes to a sleep state, for example, the task transits to the waiting state.

The ready state is a state in which the execution time of the processor 10 can be allocated to tasks but the execution time of the processor 10 has not been allocated. The ready state is, for example, a state in which a task is awakened. When the execution time of the processor 10 is allocated by the task schedulers 23, 25, 27, and 29, for example, the task in the ready state transits to the running state.

The waiting state is a state in which the execution time of the processor 10 cannot be allocated to tasks and the execution time of the processor 10 has not been allocated. The waiting state is, for example, a state in which a task is in the sleep state. When the sleep time is expired, or when the task is awakened from the sleep state upon reception of an inter-task communication from another task, for example, the task in the waiting state transits to the ready state.

The suspended state is a state in which the execution time of the processor 10 cannot be allocated to tasks and the execution time of the processor 10 has not been allocated. The suspended state is, for example, a state in which execution of a task in the ready state is temporarily inhibited by the partition scheduler 21, the task scheduler 23, 25, or 27, or another task. When the suspended state is released by the partition scheduler 21, the task scheduler 23, 25, or 27, or another task, the task in the suspended state transits to the ready state.

The waiting-suspended state is a state in which the execution time of the processor 10 cannot be allocated to tasks and the execution time of the processor 10 has not been allocated. The waiting-suspended state is, for example, a state in which execution of a task in the waiting state is temporarily inhibited by the partition scheduler 21, the task scheduler 23, 25, or 27, or another task. When the suspended state is released by the partition scheduler 21, the task scheduler 23, 25, or 27, or another task, the task in the suspended state transits to the waiting state. Further, when the task in the suspended state is awakened, the task transits to the suspended state.

The dormant state is a state in which the execution time of the processor 10 cannot be allocated to tasks and the execution time of the processor 10 has not been allocated. The dormant state is, for example, a state in which a task is not activated, or a state in which a task is finished.

Referring next to FIG. 11, termination processing of the safety control task 28 according to the second embodiment will be described. FIG. 11 is a flowchart showing a specific example of the termination procedure of the safety control task 28 according to the second embodiment.

When TP3 is activated, the task scheduler 27 allocates the execution time of the processor 10 to the safety control task 28. The safety control task 28 to which the execution time of the processor 10 has been allocated executes the processing prescribed to ensure functional safety as described above. When the processing is finished, the safety control task 28 sets the TP processing end flag stored in the execution memory 11 (S81).

The safety control task 28 releases the execution time of the processor 10 after setting the TP processing end flag, and transits to the ready state. The safety control task 28 transits to the ready state by executing a system call for releasing the execution time of the processor 10, for example. As a result, the execution time of the processor 10 is allocated to the task scheduler 27, the task scheduler 27 is executed (S82).

Figure 12:
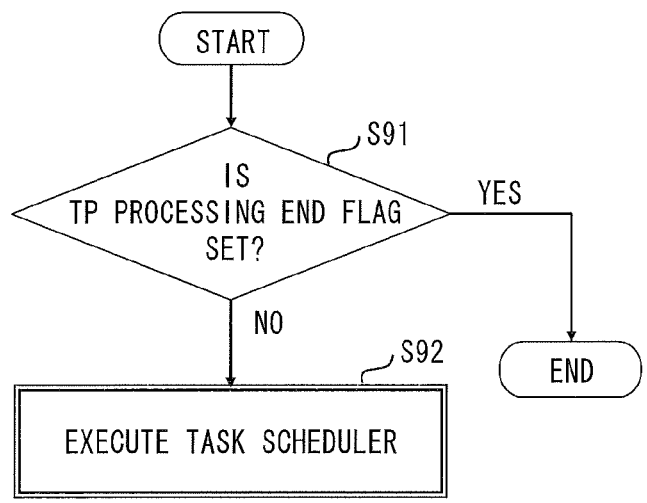
FIG. 12 is a flowchart showing a specific example of a procedure of a task scheduler according to the second embodiment of the invention.

Referring next to FIG. 12, processing of the task scheduler 27 according to the second embodiment will be described. FIG. 12 is a flowchart showing a specific example of the procedure of the task scheduler 27 according to the second embodiment.

The task scheduler 27, when executed, determines whether the TP processing end flag is set or not (S91). When the TP processing end flag is set (Yes in S91), the task scheduler 27 does not execute the task scheduling. As a result, after the processing of the safety control task 28 in TP3 is executed, for example, even when the safety control task 28 is in the ready state, the processing can be prevented from being executed in the same period of TP3 again. When the TP processing end flag is not set (No in S91), the task scheduler 27 executes the scheduling of tasks belonging to TP3 (S92). As a result, the execution time of the processor 10 is allocated to the safety control task 28.

Figure 13:
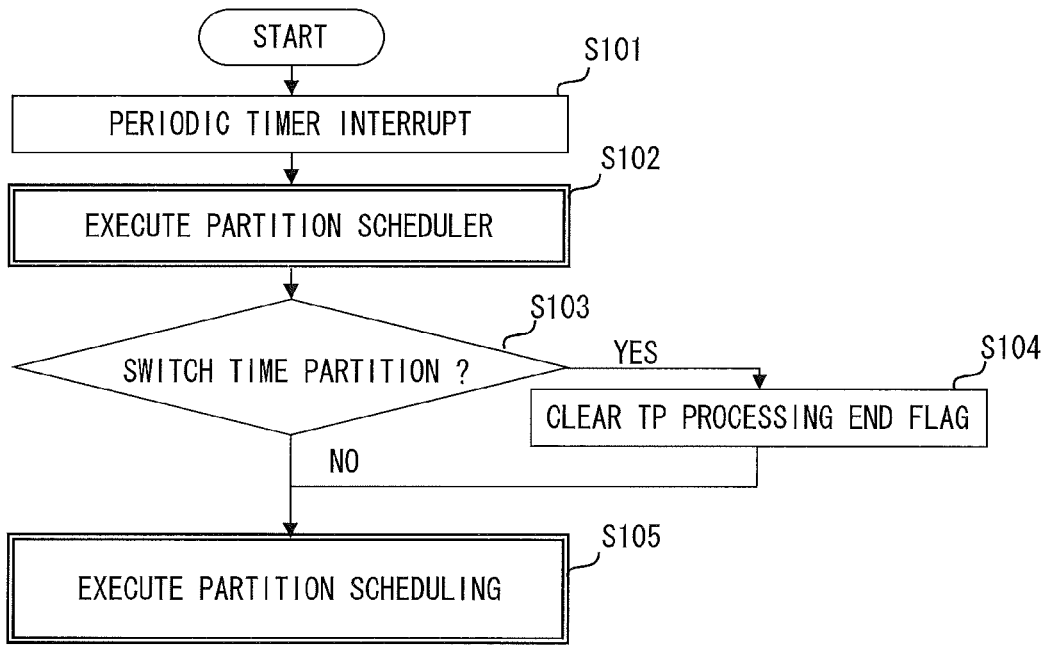
FIG. 13 is a flowchart showing a specific example of a procedure of a partition scheduler according to the second embodiment of the invention.

Referring next to FIG. 13, processing of the partition scheduler 21 according to the second embodiment will be described. FIG. 13 is a flowchart showing a specific example of a procedure of the partition scheduler 21 according to the second embodiment.

Every time a periodic timer interrupt to the processor 10 is generated (S101), the processor 10 executes the partition scheduler 21 (S102). In this manner, the partition scheduler 21 is executed every time a periodic timer interrupt from a timer (not shown), which is included in the microcontroller 15, is generated, the partition scheduler 21 operates in a predetermined timer period. The partition scheduler 21, when executed, determines whether to switch the TP according to the scheduling pattern (S103). For example, the determination is made by referring to the scheduling pattern and by checking whether the current execution timing corresponds to the timing at which the TP is switched.

Figure 9:
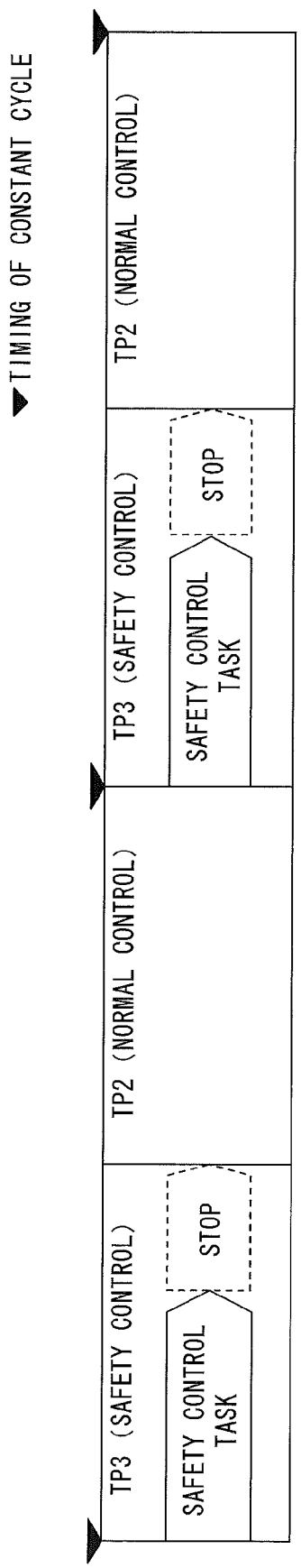
FIG. 9 is a diagram showing a specific example of a scheduling pattern according to a second embodiment of the invention.
Figure 10:
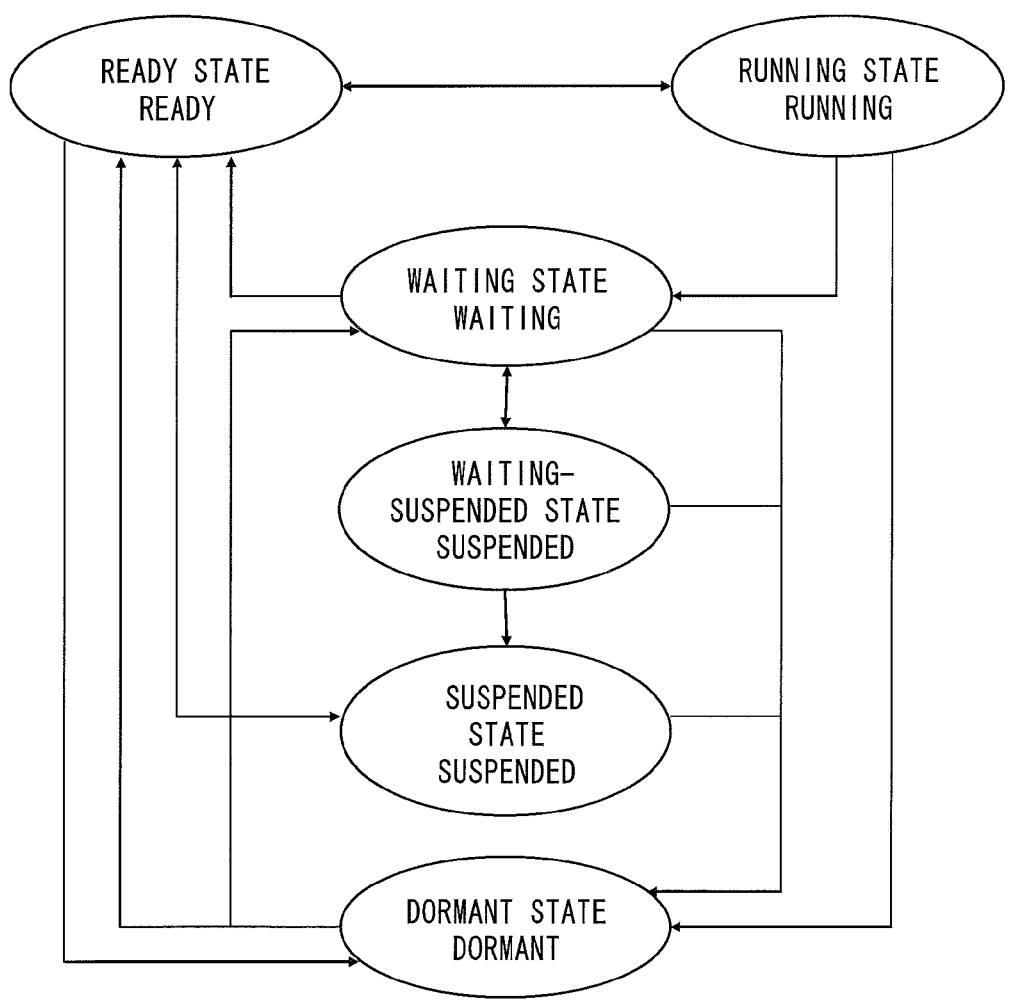
FIG. 10 is a task state transition diagram.

When the TP is switched (Yes in S103), the partition scheduler 21 clears the TP processing end flag (S104). As a result, when TP is switched from TP3 to TP2, for example, the TP processing end flag is cleared. Accordingly, when TP3 is subsequently activated, the safety control task 28 is executed by the task scheduler 27. In the second embodiment, as shown in FIG. 9, TP3 is activated in a constant cycle. Thus, the safety control task 28 is executed in the constant cycle. Note that the TP processing end flag may be cleared not when the TP is switched but before TP3 is subsequently activated. If the TP processing end flag is cleared before TP3 is subsequently activated, the safety control task 28 is executed after a constant cycle.

When the TP is not switched (No in S103), or after the processing of step S104, the partition scheduler 21 carries out the partition scheduling (S105).

As described above, in the second embodiment, when the processing is finished, the safety control task 28 stores information indicating the end of the processing into the execution memory 11, and releases the execution time of the processor 10 to transit to the ready state. Then, in the task scheduling, when the information indicating the end of the processing is stored in the execution memory 11, the task scheduler 27 inhibits allocation of the execution time of the processor 10 to the safety control task 28 even if the safety control task 28 is in the ready state.

Further, in the scheduling pattern, TP3 is set in a constant cycle. Further, the partition scheduler 21 deletes the information indicating the end of the processing during the period between the end of the period of TP3 and the start of the period of the next cycle of TP3. Accordingly, the ready state in which execution of the safety control task 28 is started can be maintained when the period of TP3 after the next constant cycle is started, while preventing the safety control task 28 from being executed again in the same period of TP3. Additionally, there is no need for awakening of the safety control task 28 from another task. Therefore, according to the second embodiment, tasks can be executed in the constant cycle, while guaranteeing the independence of the safety-related system.

<Third Embodiment of the Invention>

Subsequently, the safety controller 1 according to a third embodiment of the invention will be described. Note that the configuration of the safety controller 1 according to the third embodiment is similar to that of the safety controller 1 according to the second embodiment, so the description thereof is omitted.

Figure 14:
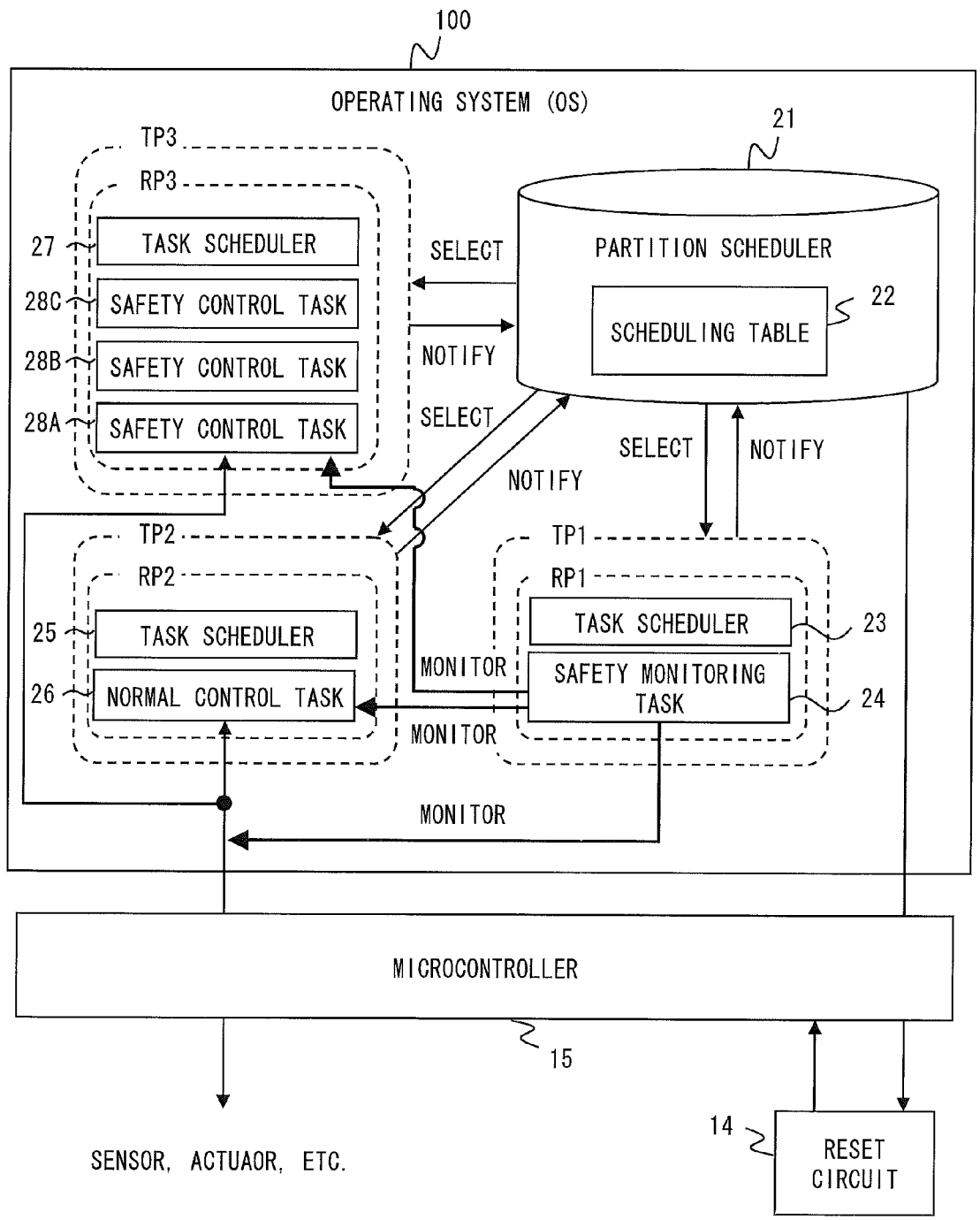
FIG. 14 is a diagram showing relationships between a partition scheduler and tasks which are activated in an execution environment provided by an OS according to the second embodiment of the invention.

Subsequently, relationships between the partition scheduler 21 and tasks generated upon activation of applications 101 to 104 will be described with reference to FIG. 14. FIG. 14 is a diagram showing the relationships between the partition scheduler 21 and tasks 24, 26, 28A, 28B, and 28C which are activated in a multiprogramming environment provided by the OS 100. Hereinafter, description of the same contents as those of the second embodiment of the present invention is omitted.

In the third embodiment, the plurality of safety control tasks 28A, 28B, and 28C are activated. The third embodiment exemplifies a case where the safety control task 28A is a task for executing the processing required to be executed in a constant cycle. The safety control tasks 28B and 28C are tasks that are not required to be executed periodically, but are to be executed only once in TP3. Here, the priorities of the tasks are preliminarily set as follows. The safety control task 28A has a highest priority; the safety control task 28B has a second highest priority; and the safety control task 28C has a lowest priority. That is, the safety control task 28A, which requires periodic execution, has a highest priority.

When the processing of each task is finished, the safety control tasks 28A, 28B, and 28C each store information indicating the end of the processing of the task in the execution memory 11. Specifically, the execution memory 11 stores a plurality of task processing end flags, each of which indicates whether the processing of the task has been finished or not, so as to respectively correspond to the safety control tasks 28A, 28B, and 28C. When the processing is finished, the safety control tasks 28A, 28B, and 28C each set the task processing end flag. That is, when the task processing end flag is set, the task processing end flag indicates that the processing of the safety control task has been finished. When the task processing end flag is cleared, the task processing end flag indicates that the processing of the safety control task has not been finished. After setting the task processing end flag, each of the safety control tasks 28A, 28B, and 28C allows the task scheduler 27 to operate. In other words, after setting the TP processing end flag, each of the safety control tasks 28A, 28B, and 28C releases the execution time of the processor 10 and transits to the ready state.

The task scheduler 27 performs scheduling of tasks belonging to TP3 so that the tasks are executed in descending order of priorities. When the task processing end flag is set, the task scheduler 27 excludes the safety control task corresponding to the task processing end flag from the allocation target of the execution time of the processor 10, even if the safety control task is in the ready state.

Figure 15:
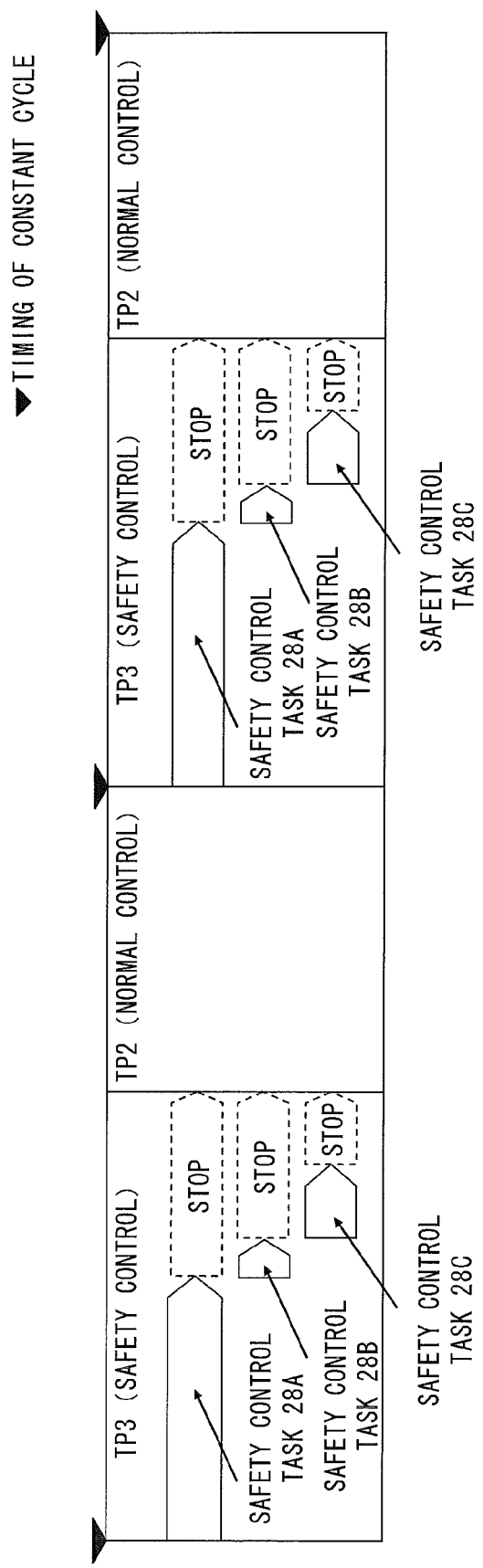
FIG. 15 is a diagram showing a specific example of a scheduling pattern according to a third embodiment of the invention.

When the TP is switched, the partition scheduler 21 clears the task processing end flag. In the third embodiment, a case is described in which the partition scheduler 21 performs partition scheduling in accordance with the scheduling pattern illustrated in FIG. 15. That is, in the third embodiment, the scheduling table 22 holes the scheduling pattern illustrated in FIG. 15. As illustrated in FIG. 15, the scheduling pattern according to the third embodiment defines the switching order and timing of TPs so that TP3 is activated in a constant cycle.

Figure 16:
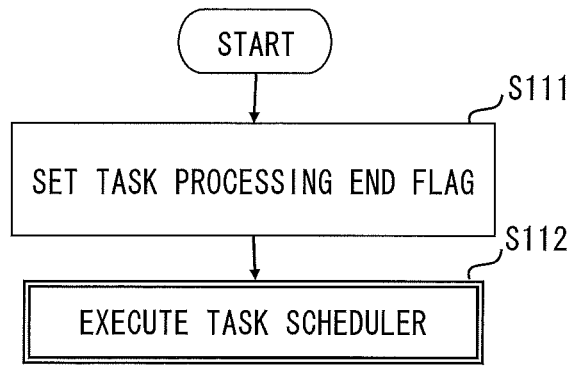
FIG. 16 is a flowchart showing a specific example of a termination procedure for a safety control task according to the third embodiment of the invention.

Referring next to FIG. 16, termination processing of the safety control tasks 28A, 28B, and 28C according to the third embodiment will be described. FIG. 16 is a flowchart showing a specific example of the termination procedure of the safety control tasks 28A, 28B, and 28C according to the third embodiment.

When TP3 is activated, the task scheduler 27 allocates the execution time of the processor 10 to any one of the safety control tasks 28A, 28B, and 28C. The safety control task to which the execution time of the processor 10 has been allocated executes the processing prescribed to ensure functional safety as described above. When the processing is finished, the safety control task sets the task processing end flag stored in the execution memory 11 (S111).

After setting the task processing end flag, the safety control task 28 releases the execution time of the processor 10 and transits to the ready state. As a result, the execution time of the processor 10 is allocated to the task scheduler 27, and the task scheduler 27 is executed (S112).

Figure 17:
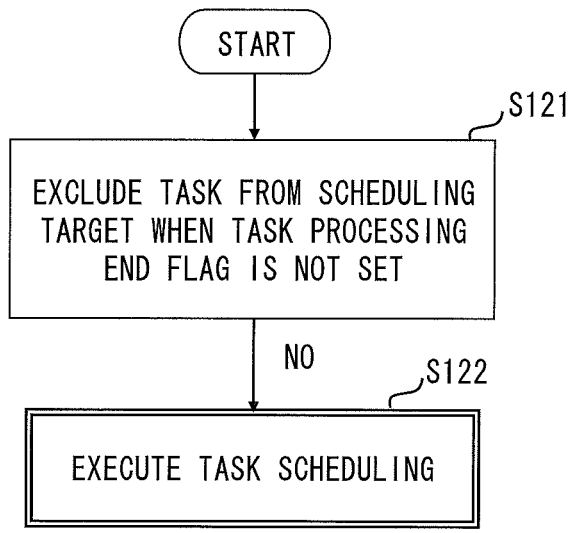
FIG. 17 is a flowchart showing a specific example of a procedure of a task scheduler according to the third embodiment of the invention.

Referring next to FIG. 17, processing of the task scheduler 27 according to the third embodiment will be described. FIG. 17 is a flowchart showing a specific example of a procedure of the task scheduler 27 according to the third embodiment.

The task scheduler 27, when executed, determines whether the task processing end flag is set or not (S121). When the task processing end flag is set, the task scheduler 27 excludes the safety control task corresponding to the task processing end flag from the scheduling target. As a result, after the safety control task 28 in TP3 is executed, the task is prevented from being executed in the same period of TP3 again even if the safety control task 28A is in the ready state. The task scheduler 27 executes scheduling of tasks belonging to TP3 (S122).

In the second embodiment, as described above, the tasks are executed according to the priorities of the tasks in the order of the safety control task 28A, the safety control task 28B, and the safety control task 28C. In this case, each processing shown in FIGS. 16 and 17 is executed, and the safety control tasks 28A, 28B, and 28C are executed as shown in FIG. 15.

Specifically, first, the task scheduler 27 executes the safety control task 28A having the highest priority. When the processing is finished, the safety control task 28A sets the task processing end flag (S111). After that, the executed task scheduler 27 excludes the safety control task 28A from the scheduling target (S112, S121) because the task processing end flag corresponding to the safety control task 28A is set. Accordingly, the task scheduler 27 then executes the safety control task 28B having the second highest priority (S122).

When the execution of the processing is finished, the safety control task 28B sets the task processing end flag (S111).

After that, the executed task scheduler 28 excludes the safety control task 28B from the schedule target (S112, S121) because the task processing end flag corresponding to the safety control task 28B is set. Accordingly, the task scheduler 27 then executes the safety control task 28C having the second highest priority (S122).

When the execution of the processing is finished, the safety control task 28C sets the task processing end flag (S111). After that, the executed task scheduler 27 excludes the safety control task 28C from the scheduling target (S112, S121) because the task processing end flag corresponding to the safety control task 28C is set. At this time, all the safety control tasks 28A, 28B, and 28C are excluded from the scheduling target, so the task scheduler 27 stops execution of any of the safety control tasks 28A, 28B, and 28C belonging to TP3.

Figure 18:
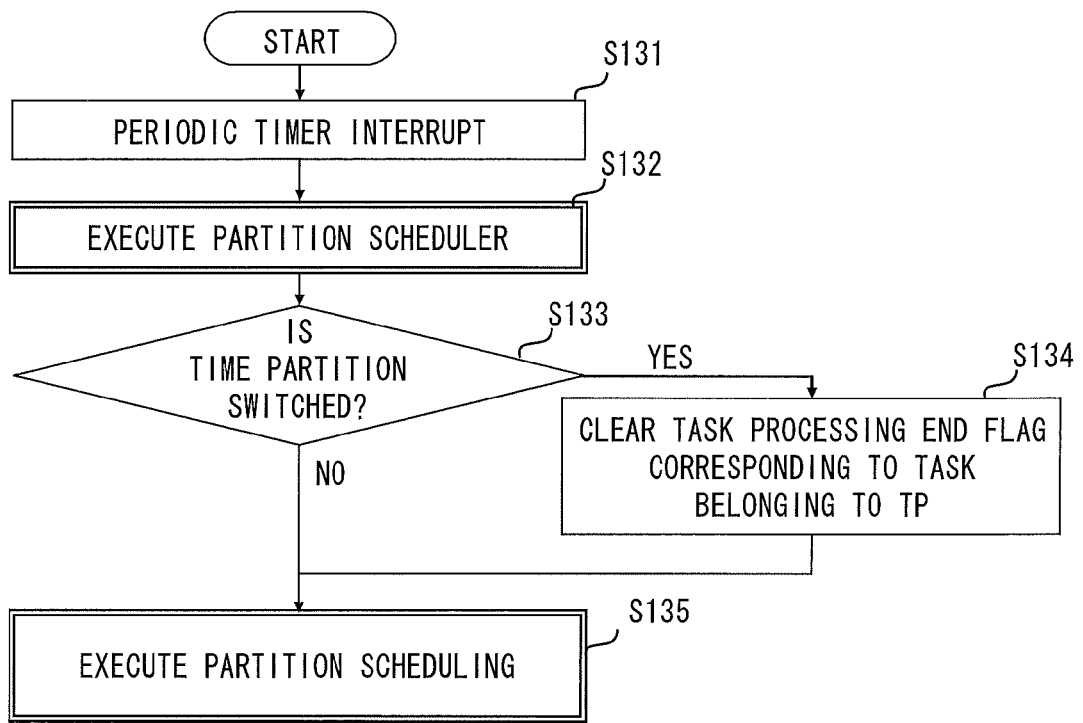
FIG. 18 is a flowchart showing a specific example of a procedure of a partition scheduler according to the third embodiment of the invention.

Referring next to FIG. 18, processing of the partition scheduler 21 according to the third embodiment will be described. FIG. 18 is a flowchart showing a specific example of a procedure of the partition scheduler 21 according to the third embodiment.

Every time a periodic timer interrupt to the processor 10 is generated (S131), the processor 10 executes the partition scheduler 21 (S132). The partition scheduler 21, when executed, determines whether or not to switch the TP in accordance with the scheduling pattern (S133).

When the TP is switched (Yes in S133), the partition scheduler 21 clears the task processing end flag corresponding to the task belonging to TP3 (S134). As a result, when the TP is switched from TP3 to the subsequent TP2, for example, the task processing end flag is cleared. Accordingly, when TP3 is subsequently activated, the safety control tasks 28A, 28B, and 28C are executed by the task scheduler 27.

When the TP is not switched (No in S133), or after the processing of step S134, the partition scheduler 21 performs the partition scheduling (S135). Note that, as described above, the TP processing end flag may be cleared not when the TP is switched, but before TP3 is subsequently activated.

As described above, in the third embodiment, the execution time of the processor 10 is further allocated, in TP3, to the safety control tasks 28B and 28C each having a lower priority than the safety control task 28A, unlike the second embodiment. Accordingly, after the execution of the safety control task 28A is finished, the period in which the processor 10 executes no processing is eliminated. This permits improvement in the use efficiency of the processor 10.

Furthermore, in the third embodiment, since the safety control task 28A which requires periodic execution has the highest priority, the safety control task 28A is executed when the period of the TP3 in the constant cycle is started. Accordingly, also in the third embodiment, the safety control task 28A can be executed in the constant cycle.

<Fourth Embodiment of the Invention>

Subsequently, the safety controller 1 according to a fourth embodiment of the invention will be described. Note that the configuration of the safety controller 1 according to the fourth embodiment is similar to that of the safety controller according to the first embodiment. Also the relationships between the partition scheduler 21 and the tasks 24, 26, and 28 are similar to those of the configuration of the safety controller 1 according to the first embodiment. Hereinafter, description of the same contents as those of the safety controller 1 according to the first embodiment is omitted.

In the fourth embodiment, a task for executing the processing required to be executed in a constant cycle notifies the partition scheduler 21 that the processing is finished, when the processing of the task is finished. In the fourth embodiment, a case is described in which the safety control task 28 is a task for executing the processing required to be executed in a constant cycle.

Figure 19:
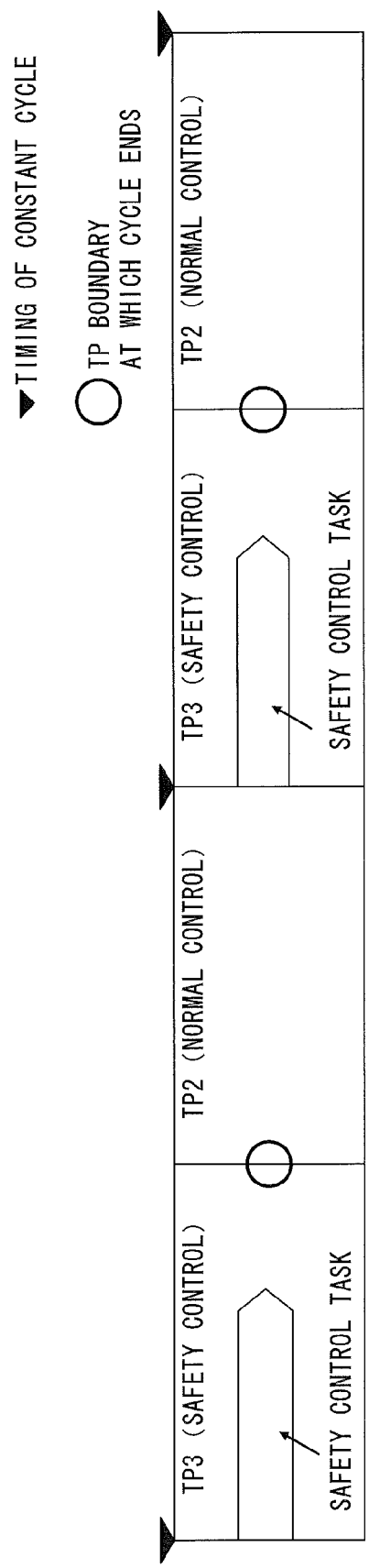
FIG. 19 is a diagram showing a specific example of a scheduling pattern according to a fourth embodiment of the invention.

In the fourth embodiment, a case is described in which the partition scheduler 21 performs partition scheduling in accordance with the scheduling pattern illustrated in FIG. 19. That is, in the fourth embodiment, the scheduling table 22 holds the scheduling pattern illustrated in FIG. 19. The scheduling pattern according to the fourth embodiment defines the switching order and timing of TPs so that TP3 is activated in a constant cycle, as illustrated in FIG. 19. Hereinafter, a timing at which the TP is switched is also referred to as "TP boundary". Additionally, in the scheduling pattern according to the fourth embodiment, as illustrated in FIG. 19, TP boundaries at which a cycle ends are registered for the safety control task 28. Here, each TP boundary at which a cycle ends indicates a timing for switching the TP in which the processing of the safety control task 28 requiring periodic execution should be finished at that time. In the fourth embodiment, the TP boundary at which a cycle ends is held at a timing for switching to the subsequent TP2 from TP3 to which the safety control task 28 requiring periodic execution belongs.

Figure 20:
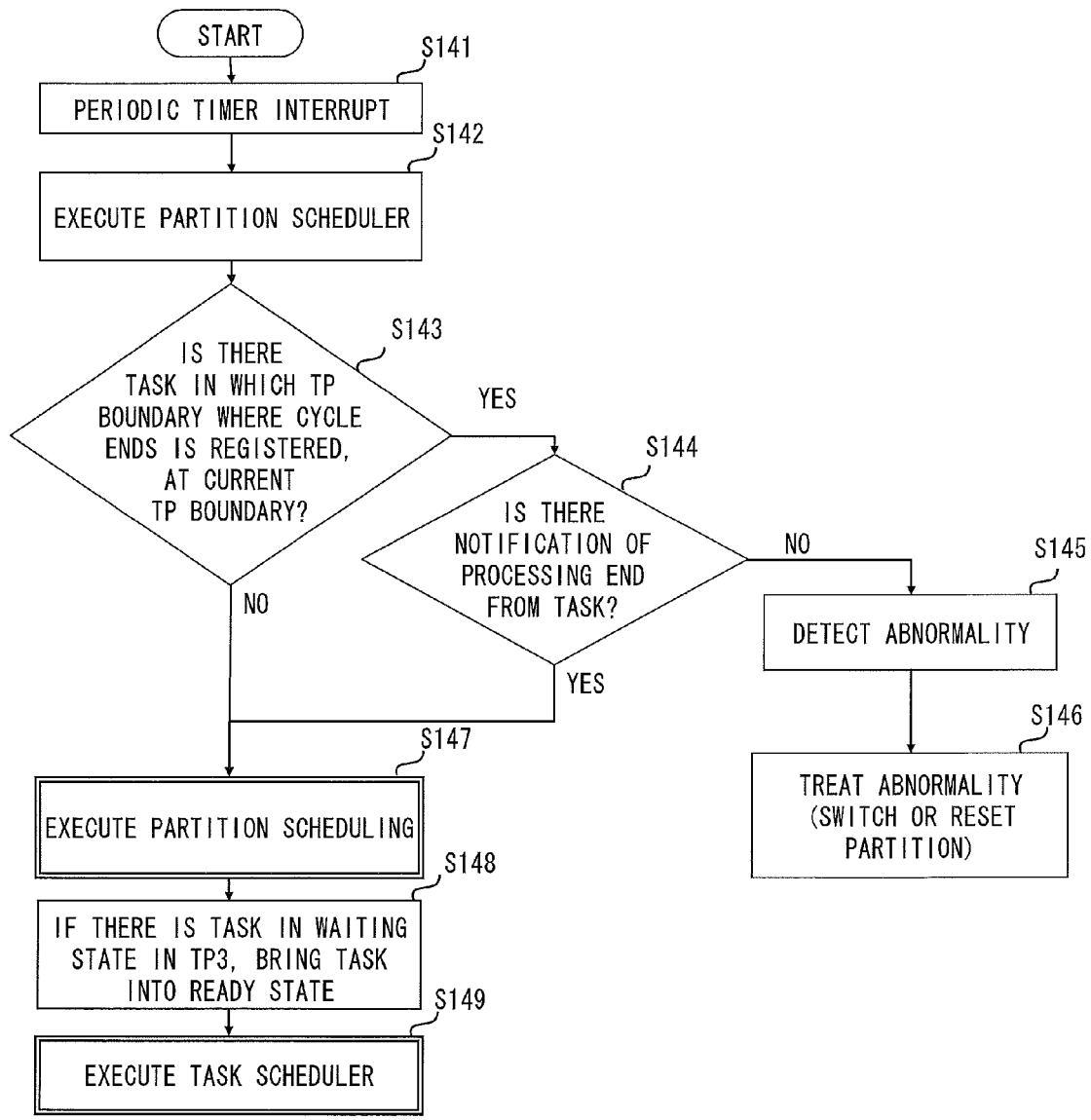
FIG. 20 is a flowchart showing a specific example of a procedure of a partition scheduler according to the fourth embodiment of the invention.

Referring next to FIG. 20, processing of the partition scheduler 21 according to the fourth embodiment will be described. FIG. 20 is a flowchart showing a specific example of a procedure of the partition scheduler 21 according to the fourth embodiment.

Every time a periodic timer interrupt to the processor 10 is generated (S141), the processor 10 executes the partition scheduler 21 (S142). The partition scheduler 21, when executed at a TP boundary, executes the following processing. The partition scheduler 21 determines whether the task for which the TP boundary at which the cycle ends is registered is present or not at the current TP boundary (S143). In the fourth embodiment, the TP boundary at which the cycle ends is registered for the safety control task 28. Accordingly, it is determined that the task for which the TP boundary at which the cycle ends is registered is present at the TP boundary between TP3 and TP2.

When the task for which the TP boundary at which the cycle ends is registered is present (Yes in S143), the partition scheduler 21 determines whether the processing end is notified from the task (S144). In the fourth embodiment, it is determined whether a notification is issued from the safety control task 28. Here, the end of the processing may be notified to the partition scheduler 21 based on a flag indicating the end of the processing like in the second embodiment or the third embodiment, or may be notified to the partition scheduler 21 from the task by means of an inter-task communication.

When the processing end is not notified from the safety control task 28 (No in S144), the partition scheduler 21 determines that an abnormality occurs (S145). In that case, the partition scheduler 21 executes processing according to the abnormality (S146). When the abnormality caused due to the fact that the processing of the safety control task 28 is not finished in the constant cycle is an abnormality that can be dealt with by switching the TP to another TP and by executing the task belonging to the another TP, the partition scheduler 21 switches the TP from TP3 to another TP. When the abnormality caused due to the fact that the processing of the safety control task 28 is not finished in the constant cycle is an abnormality requiring emergency stop, the partition scheduler 21 resets the microcontroller 15.

When the task for which the TP boundary at which the cycle ends is registered is not present (No in S143), or when the processing end is notified from the safety control task 28

(Yes in S144), the partition scheduler 21 executes partition scheduling (S147). At this time, when the safety control task 28 belonging to TP3 is in the waiting state, the partition scheduler 21 brings the safety control task 28 into the ready state. For example, the partition scheduler 21 awakens the safety control task 28 to be brought into the ready state by means of an inter-task communication for the safety control task 28. As a result, the safety control task 28 is executed in the constant cycle. Note that, as in the second embodiment and the third embodiment, the safety control task 28 may be executed in the constant cycle in such a manner that the safety control task 28 remains in the ready state and is prevented from being executed in the same period of TP3 by using a flag indicating the end of the processing. Then, the partition scheduler 21 executes the task scheduler belonging to a TP subsequent to TP3 (S148).

As described above, in the fourth embodiment, when the period of the time partition in which the safety control task 28 is executed in the constant cycle is finished, the partition scheduler 21 determines whether the processing end is notified from the safety control task 28. This eliminates the need to incorporate a mechanical for monitoring each of the applications, such as the safety control application 103, for generating the safety control task 28, thereby simplifying the software configuration.

<Fifth Embodiment of the Invention>

Subsequently, the safety controller 1 according to a fifth embodiment of the invention will be described. The configuration of the safety controller 1 according to the fifth embodiment is similar to that of the safety controller 1 according to the first embodiment, so the description thereof is omitted.

Figure 21:
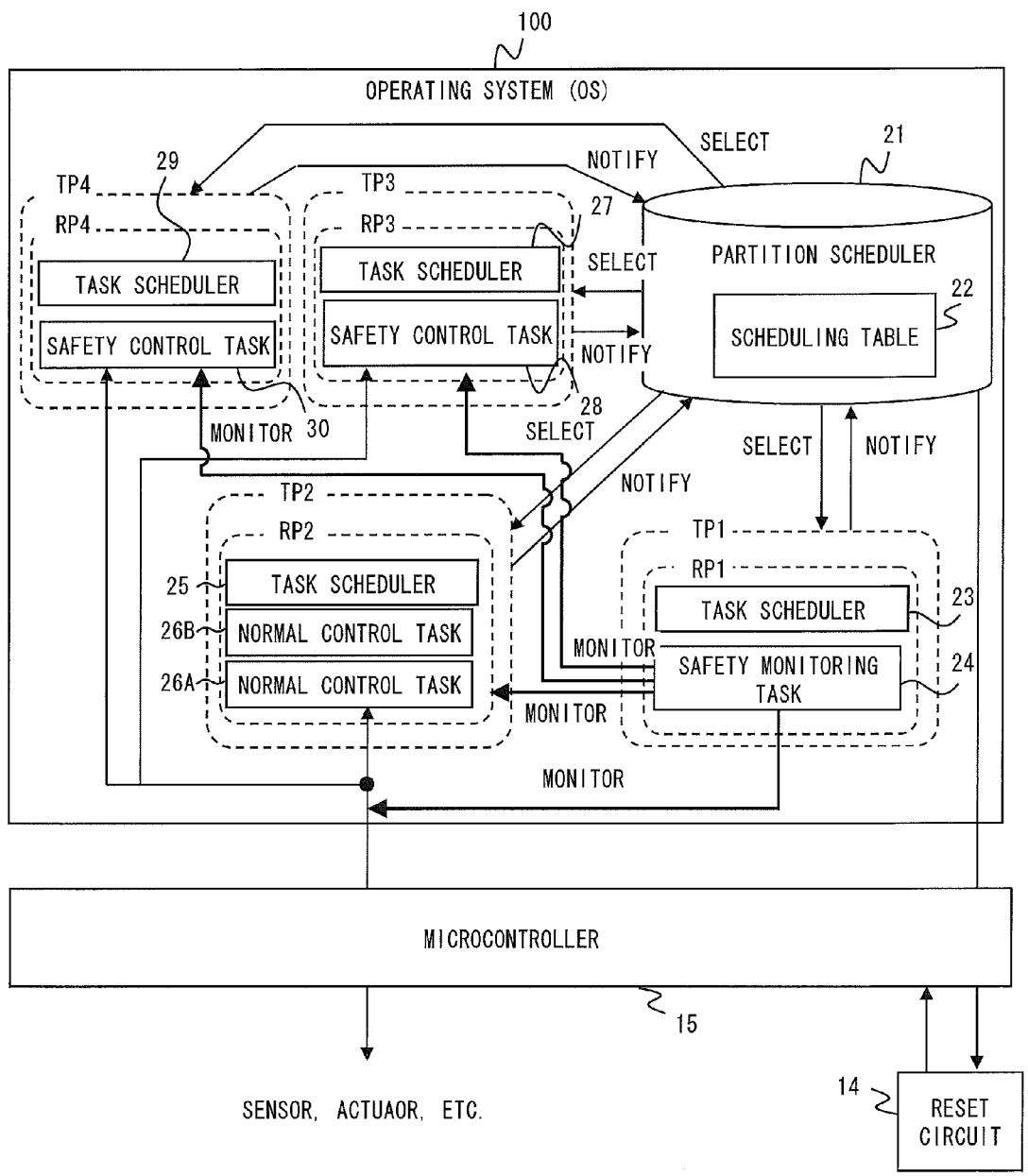
FIG. 21 is a diagram showing relationships between a partition scheduler and tasks which are activated in an execution environment provided by an OS according to a fifth embodiment of the invention.

Subsequently, relationships between the partition scheduler 21 and tasks activated upon activation of the applications 101 to 104 will be described with reference to FIG. 21. FIG. 21 is a diagram showing the relationships between the partition scheduler 21 and tasks 24, 26A, 26B, 28, and 30 which are activated in a multiprogramming environment provided by the OS 100. Hereinafter, description of the same contents as those of the first embodiment of the present invention is omitted.

An OS 200 according to the fifth embodiment includes a plurality of safety control partitions TP3 and TP4. Further, in the fifth embodiment, a plurality of normal control tasks 26A and 26B are activated. The fifth embodiment exemplifies a case where the safety monitoring task 24, the normal control tasks 26A and 26B, and the safety control task 30 are tasks for executing the processing required to be executed in a constant cycle.

Figure 22:
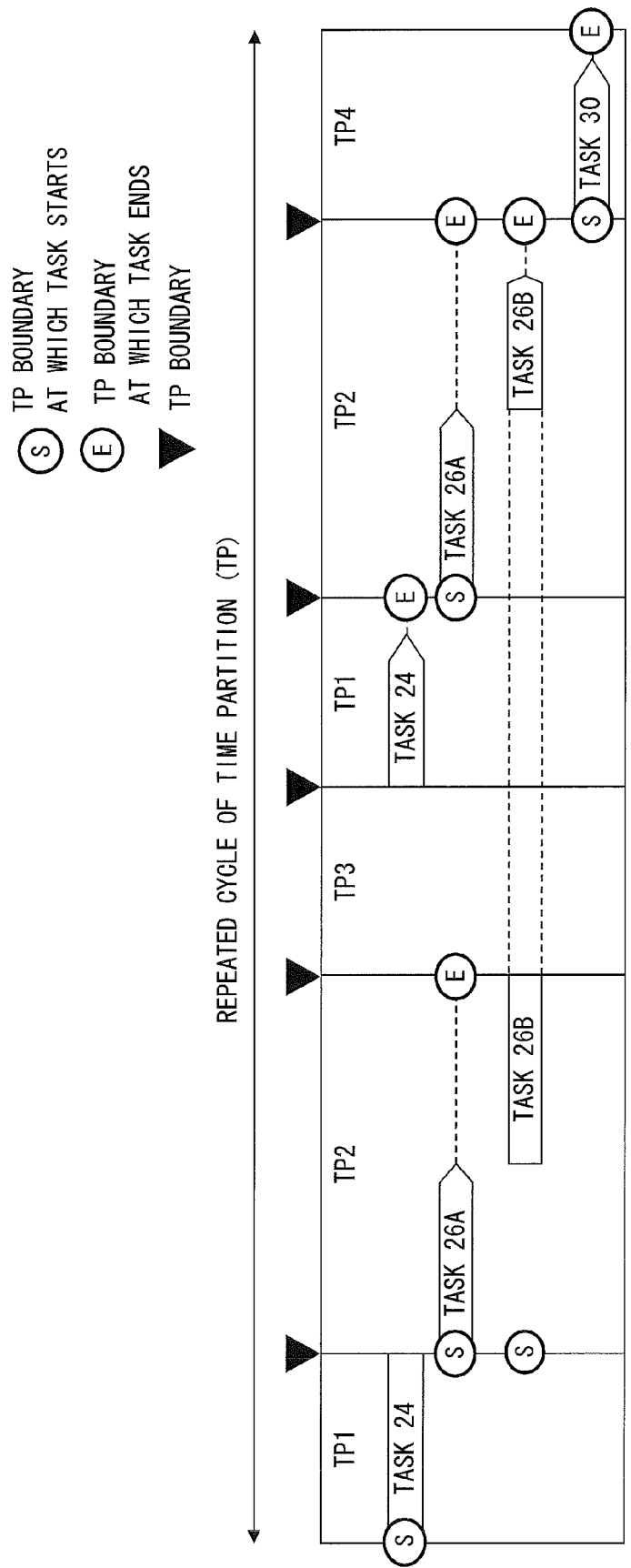
FIG. 22 is a diagram showing a specific example of a scheduling pattern according to the fifth embodiment of the invention.

In the fifth embodiment, a case is described in which the partition scheduler 21 performs partition scheduling in accordance with the scheduling pattern illustrated in FIG. 22. That is, in the fifth embodiment, the scheduling table 22 holds the scheduling pattern illustrated in FIG. 22. As illustrated in FIG. 22, the scheduling pattern according to the fifth embodiment holds a TP boundary at which a task starts and a TP boundary at which a task ends. The TP boundary at which a task starts indicates a timing at which execution of the task is started. The TP boundary at which a task ends indicates a timing at which execution of the task is finished.

Here, in the scheduling pattern illustrated in FIG. 22, the period of each TP1, the period of TP3, and the period of TP4 have the same length. Additionally, each TP2 has the same length of period. Accordingly, in FIG. 22, the TP boundaries at which each tasks starts are set at the timings at which each of the tasks 24, 26A, 26B, and 28 is executed in the constant cycle. Further, in FIG. 22, the TP boundaries at which each task ends are set at the timings at which execution of each of the tasks 24, 26A, 26B, and 30 should be finished in a constant cycle.

The task scheduler 29 performs scheduling of the safety control task 30 belonging to TP4, in a similar manner as the task schedulers 23, 25, and 27.

Upon switching the TP, when the TP boundary at which the task starts is set at the TP boundary corresponding to the switching timing in the scheduling pattern, the partition scheduler 21 starts execution of the task. Further, upon switching the TP, when the TP boundary at which the task ends is set at the TP boundary corresponding to the switching timing in the scheduling pattern, the partition scheduler 21 determines whether execution of the task has been finished or not.

Figure 23:
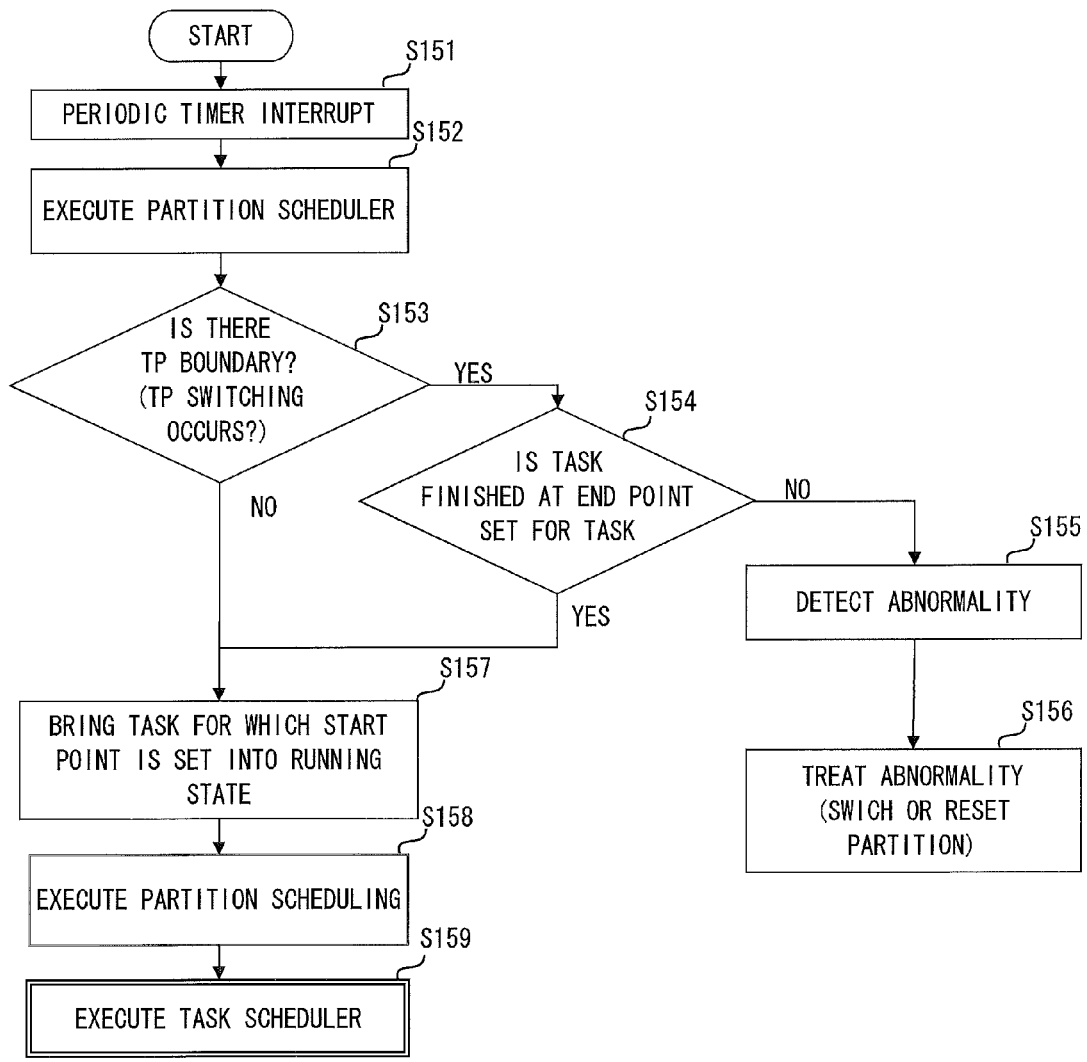
FIG. 23 is a flowchart showing a specific example of a procedure of a partition scheduler according to the fifth embodiment of the invention.

Referring next to FIG. 23, processing of the partition scheduler 21 according to the fifth embodiment will be described. FIG. 23 is a flowchart showing a specific example of a procedure of the partition scheduler 21 according to the third embodiment.

Every time a periodic timer interrupt to the processor 10 is generated (S151), the processor 10 executes the partition scheduler 21 (S152). The partition 21 determines whether the current timing corresponds to the TP boundary (S153). That is, it is determined whether TP switching occurs.

When the current timing corresponds to the TP boundary (Yes in S153), the partition scheduler 21 determines whether execution of the task for which a TP boundary at which a task ends is set at the TP boundary has been finished (S154). Whether the execution of the task has been finished or not may be determined by the partition scheduler 21 based on a flag indicating the end of the processing like in the second embodiment or the third embodiment, or may be determined based on whether the end of the processing is notified to the partition scheduler 21 from the task by means of an inter-task communication.

When the execution of the task has not been finished (No in S154), the partition scheduler 21 determines that an abnormality occurs (S155). In this case, the partition scheduler 21 executes processing according to the abnormality (S156). When the abnormality caused due to the fact that the execution of the safety control task 28 is not finished in the constant cycle is an abnormality that can be dealt with by switching the TP to another TP and by executing the task belonging to the another TP, the partition scheduler 21 switches the TP from TP3 to another TP. When the abnormality caused due to the fact that the execution of the safety control task 28 is not finished in the constant cycle is an abnormality requiring emergency stop, the partition scheduler 21 resets the microcontroller 15.

In the case where the current timing does not correspond to the TP boundary (No in S153), or in the case where the execution of the task has been finished (Yes in S154), the partition scheduler 21 brings the task into the running state, when the task for which a TP boundary at which a task starts is set at the TP boundary is present (S157). The partition scheduler 21 executes partition scheduling (S158). Then, the partition scheduler 21 executes the task scheduler belonging to the TP of a switching destination switched by the partition scheduling (S159). The executed task scheduler starts execution of the task which is brought into the running state by the partition scheduler 21.

As described above, in the fifth embodiment, a start timing for starting execution of a task is set to a TP boundary at a timing of a constant cycle. Further, an end determination timing for determining the end of execution of a task is set at the same timing of the constant cycle. Additionally, the partition scheduler 21 starts execution of the task at the TP boundary at which the start timing is set, and determines whether the execution of the task is finished at the TP boundary at which the end determination timing is set. This eliminates the need to incorporate a mechanism for monitoring each of the applications for executing the tasks 24, 26A, 26B, and 30, respectively, thereby simplifying the software configuration.

<Sixth Embodiment of the Invention>

Figure 24:
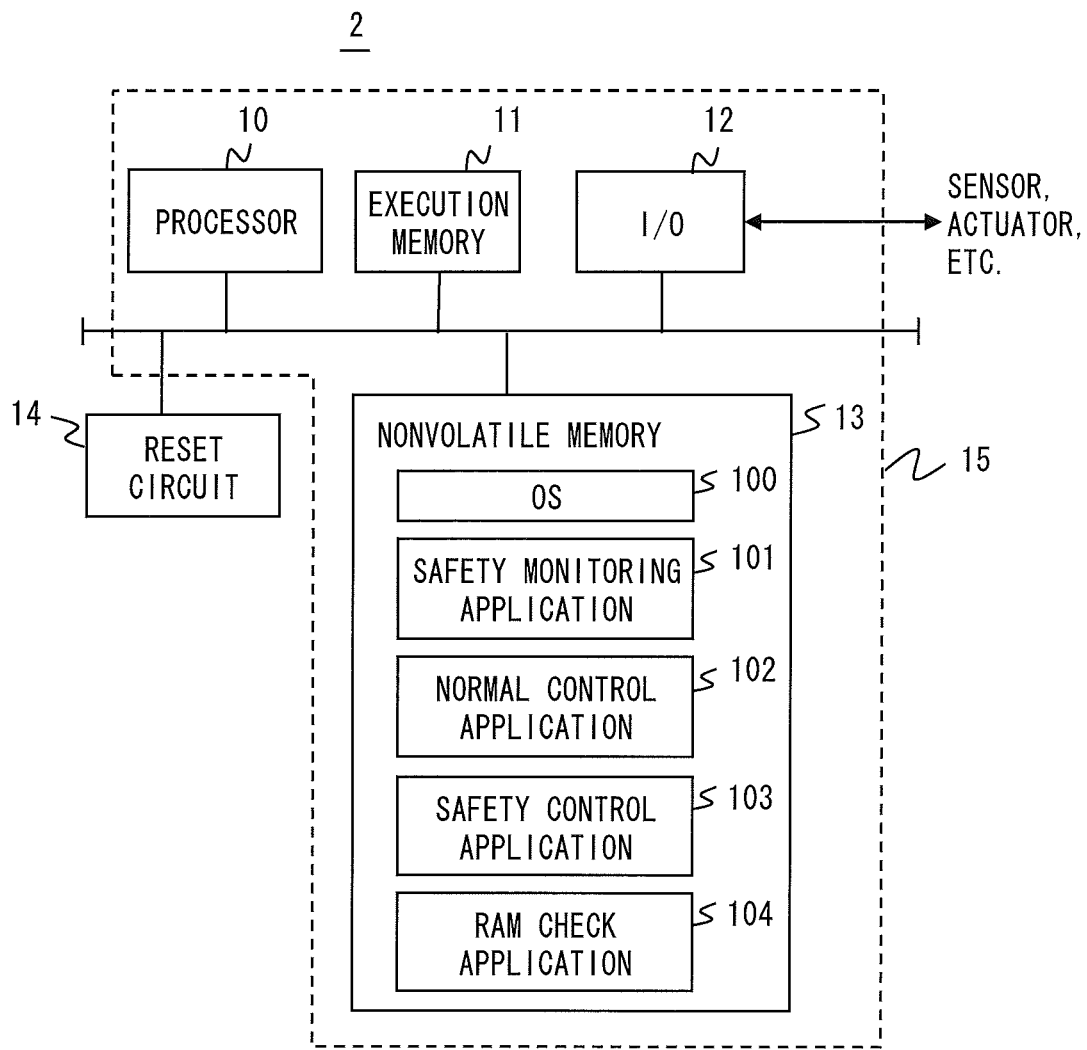
FIG. 24 is a block diagram showing a configuration example of a safety controller according to a sixth embodiment of the invention.

Referring next to FIG. 24, a safety controller 2 according to a sixth embodiment of the invention will be described. FIG. 24 is a block diagram showing a configuration example of the safety controller 2 according to the sixth embodiment. Hereinafter, description of the same contents as those of the safety controller 1 according to the first embodiment is omitted.

The non-volatile memory 13 stores a RAM (Random Access Memory) check application 104. The RAM check application 104 includes instruction code for executing the RAM check processing. Specifically, the RAM check processing is processing of inspecting whether the execution memory 11 is normal or not by reading and writing data with respect to the execution memory 11. Further, the RAM check application 104 may include instruction code for causing the processor 10 to execute notification of a result to the partition scheduler 21.

Figure 25:
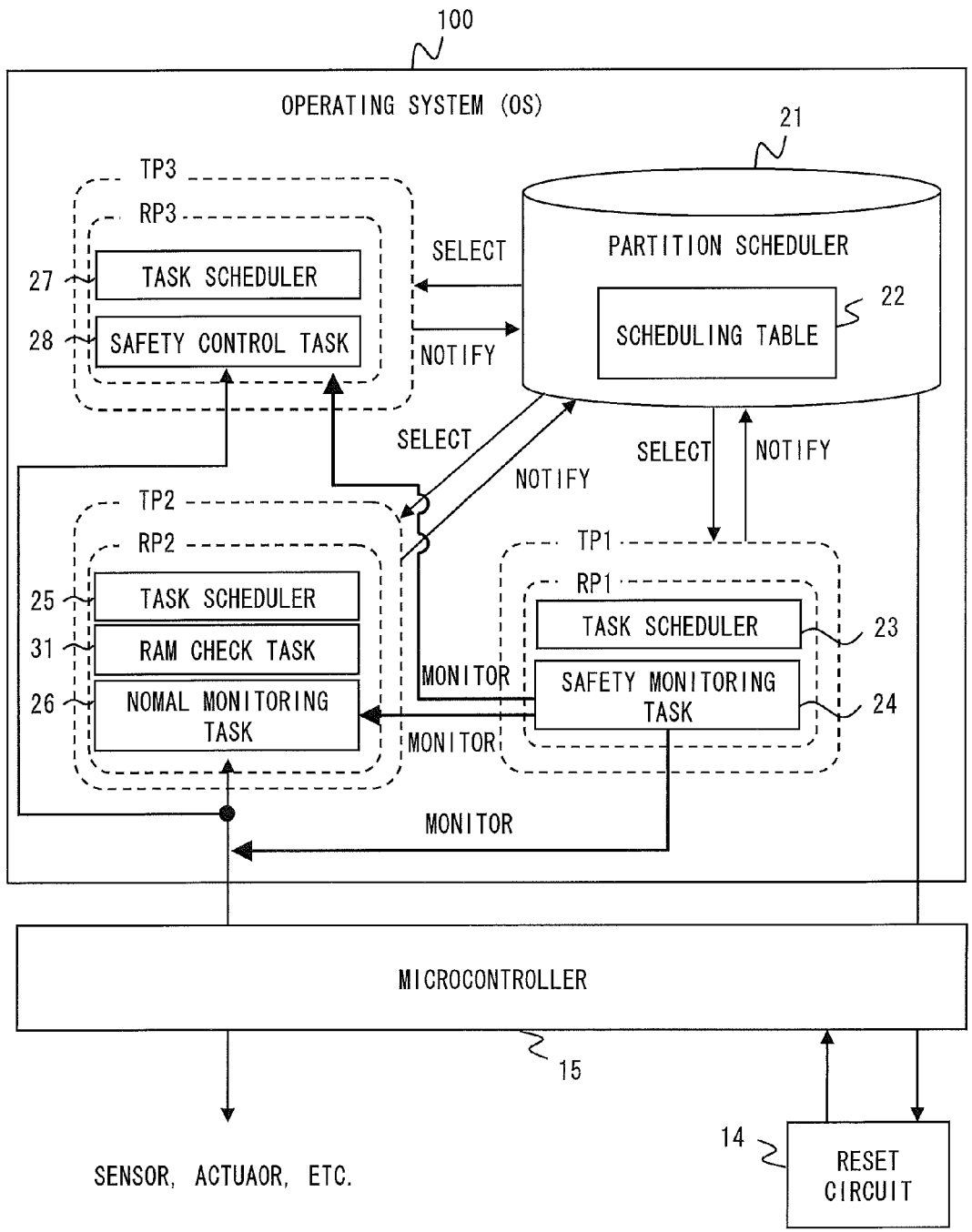
FIG. 25 is a diagram showing relationships between a partition scheduler and tasks which are activated in an execution environment provided by an OS according to the sixth embodiment of the invention.

Subsequently, relationships between the partition scheduler 21 and tasks generated upon activation of the applications 101 to 104 will be described with reference to FIG. 25. FIG. 25 is a diagram showing the relationships between the partition scheduler 21 and tasks 24, 26, 28, and 31 which are activated in a multiprogramming environment provided by the OS 100. Hereinafter, description of the same contents as those of the safety controller 1 according to the first embodiment is omitted.

The RAM check task 31 is a task that is generated upon activation of the RAM check application 104. The RAM check task 31 performs processing for inspecting whether the execution memory 11 is normal or not.

Figure 26:
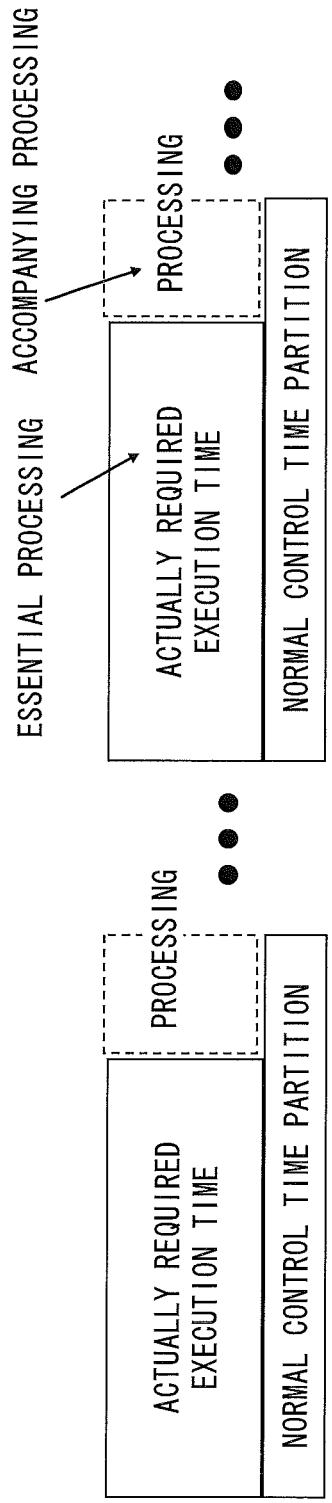
FIG. 26 is a diagram showing a specific example of processing in a normal control partition according to the sixth embodiment of the invention.

In the sixth embodiment, as illustrated in FIG. 26, the processing executed in TP2 includes essential processing which must be finished within the period of TP2, and accompanying processing which does not necessarily have to be finished within the period of TP2. In the sixth embodiment, the essential processing is processing to be executed by the normal control task 26, and the accompanying processing is processing to be executed by the RAM check task 31. The priority of the normal control task 26 for executing the essential processing is set to be higher than the priority of the RAM check task 31 for executing the accompanying processing. Here, the period of TP2 is set to be longer than the longest execution time of the normal control task 26 for executing the essential processing.

Figure 27:
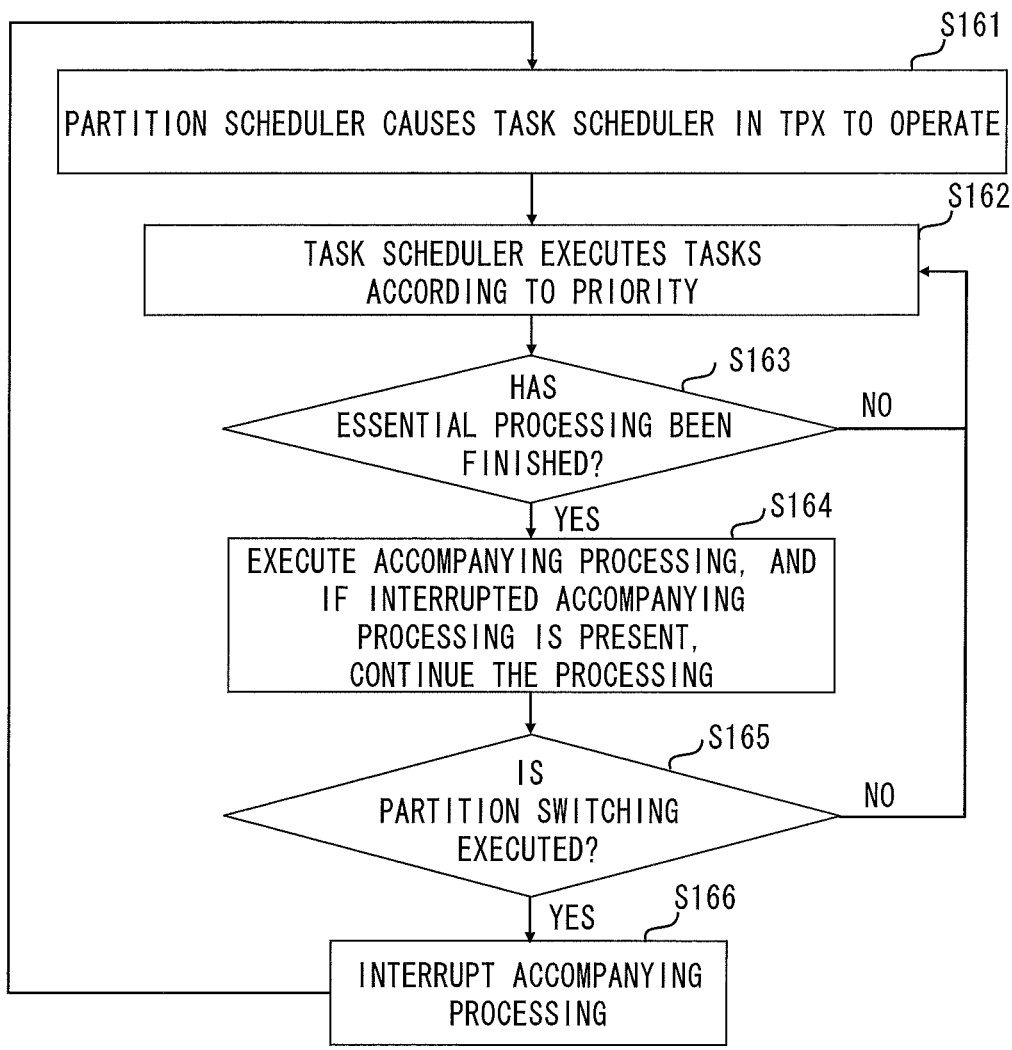
FIG. 27 is a flowchart showing a specific example of a scheduling procedure according to the sixth embodiment of the invention.

Referring next to FIG. 27, scheduling processing according to the sixth embodiment will be described. FIG. 27 is a flowchart showing a specific example of the scheduling procedure according to the sixth embodiment.

When the TP is switched to TPX, the partition scheduler 21 causes the task scheduler in TPX to operate (S161). Here, a case is described in which TPX corresponds to TP2 and the task scheduler 25 is executed. The task scheduler 25 executes tasks according to the priorities of the tasks (S162). Here, the normal control task 26 having a higher priority is executed first. The task scheduler 25 continuously executes the normal control task 26 for executing the essential processing until the essential processing is finished (No in S163, S162).

When the essential processing is finished (Yes in S163), the task scheduler 25 executes the RAM check task 31 for executing the accompanying processing (S164). Note that when the processing of the RAM check task 31 is interrupted in the previous period of TP2, execution of the processing is resumed from the interrupted point. Until a TP switching timing is reached, the task scheduler 25 continuously executes the RAM check task 31 (No in S165, S162, Yes in S163, S164).

When the TP switching timing is reached (Yes in S165), the partition scheduler 21 switches the TP. Thus, when the execution of the RAM check task 31 belonging to TP2 before the switching is not finished, the execution is interrupted. That is, the accompanying processing in the RAM check task 31 is interrupted (S166).

As described above, according to the sixth embodiment, the execution time of the processor 10 is further allocated, in TP2, to the RAM check task 31 having a lower priority than the safety control task 28A, unlike the first embodiment. Accordingly, after the execution of the safety control task 28A is finished, the period in which the processor 10 executes no processing is eliminated. This permits effective use of the execution time of the processor 10.

<Seventh Embodiment of the Invention>

Subsequently, the safety controller 2 according to a seventh embodiment of the invention will be described. Note that the configuration of the safety controller 1 according to the seventh embodiment is similar to that of the safety controller 1 according to the sixth embodiment, so the description thereof is omitted. Also the relationships between the partition scheduler 21 and the tasks 24, 26, 28, and 31 are similar to those of the safety controller 2 according to the sixth embodiment, so the description thereof is omitted.

Figure 28:
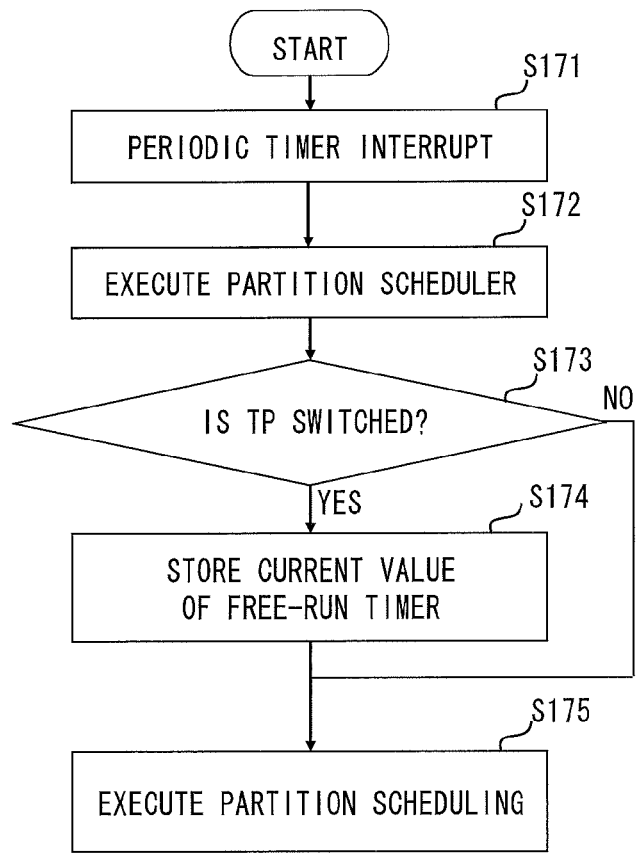
FIG. 28 is a flowchart showing a specific example of a procedure of a partition scheduler according to a seventh embodiment of the invention.

Referring next to FIG. 28, processing of the partition scheduler 21 according to the seventh embodiment will be described. FIG. 28 is a flowchart showing a specific example of a procedure of the partition scheduler 21 according to the seventh embodiment.

Every time a periodic timer interrupt to the processor 10 is generated (S171), the processor 10 executes the partition scheduler 21 (S172). The partition scheduler 21 determines whether TP switching occurs, based on the scheduling pattern (S173).

When TP switching occurs (Yes in S173), the partition scheduler 21 stores the current value indicated by a free-run timer into the execution memory 11. Thus, the execution memory 11 stores the time when the TP starts. The free-run timer (not shown) is included in the processor 10.

When TP switching does not occur (No in S173), and after the storage of the value of the free-run timer, the partition scheduler 21 executes partition scheduling (S175).

Figure 29:
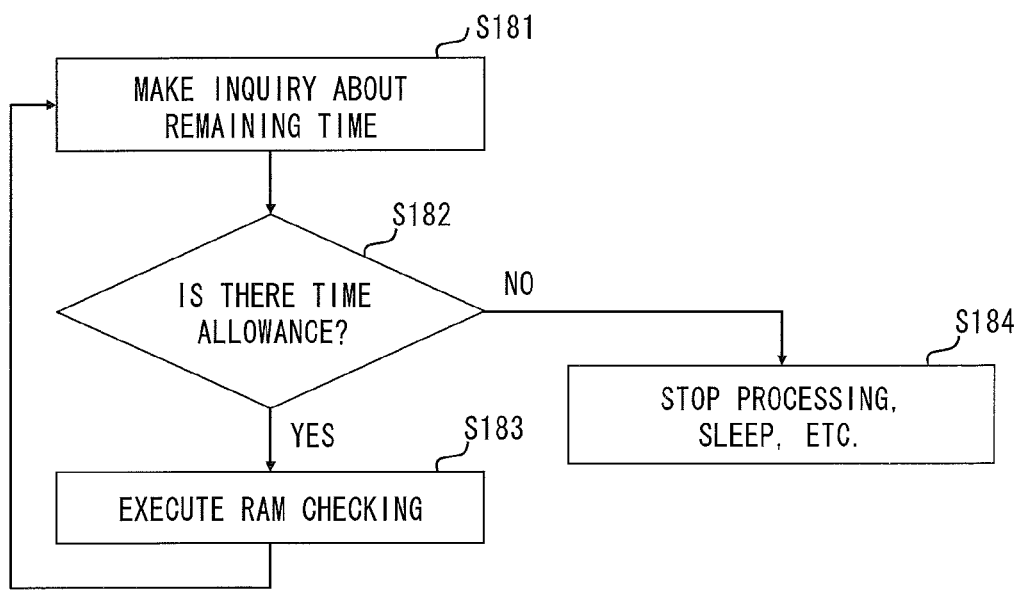
FIG. 29 is a flowchart showing a specific example of a procedure for a RAM check task according to the seventh embodiment of the invention.
Figure 30:
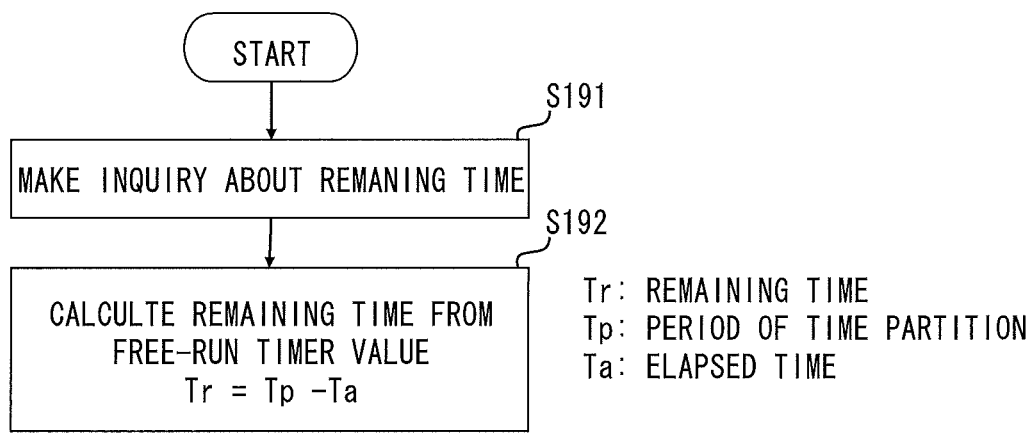
FIG. 30 is a flowchart showing a specific example of a procedure of a RAM check task according to the seventh embodiment of the invention.
Figure 31:
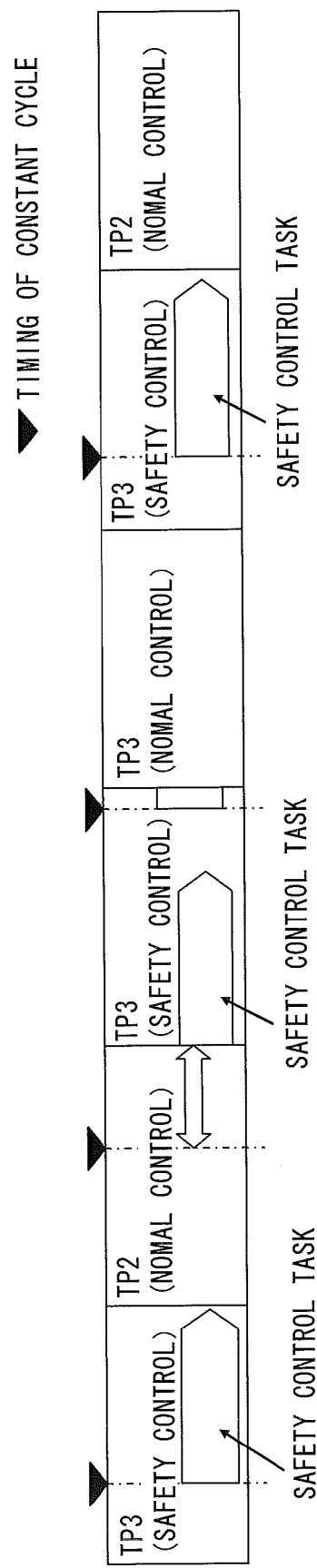
FIG. 31 is a diagram for explaining a problem.
Figure 32:
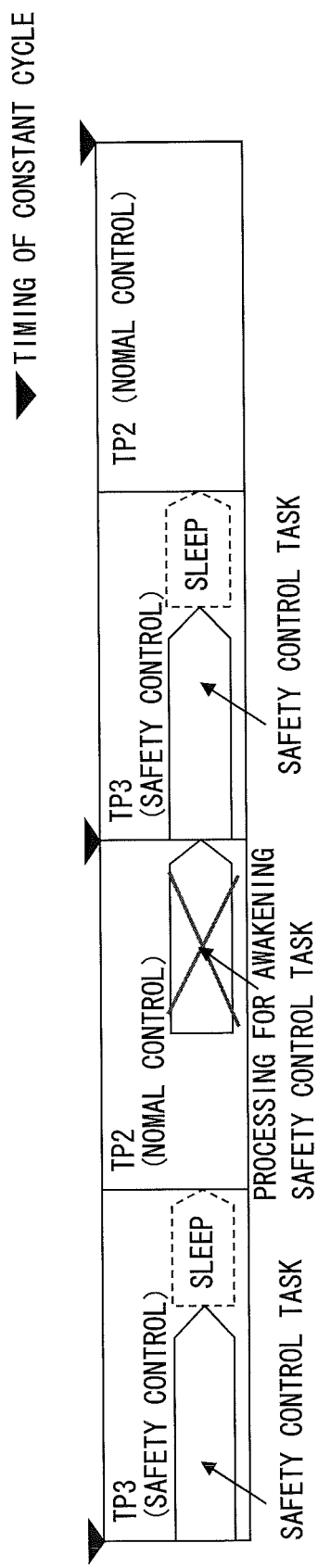
FIG. 32 is a diagram for explaining a problem.
Figure 33:
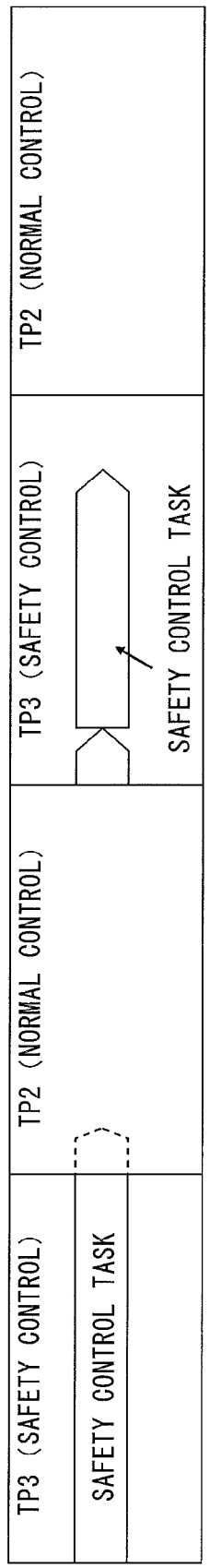
FIG. 33 is a diagram for explaining a problem.
Figure 34:
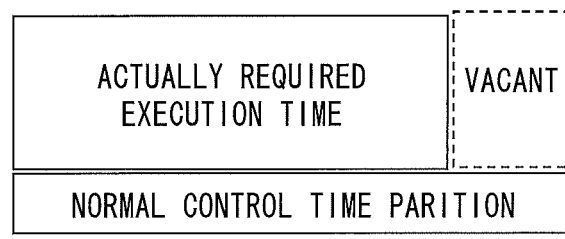
FIG. 34 is a diagram for explaining a problem.

Referring next to FIG. 29, processing of the RAM task 31 according to the seventh embodiment will be described. FIGS. 29 and 30 are flowcharts each showing a specific example of a procedure of the RAM check task 31 according to the seventh embodiment.

In the case of RAM checking, the RAM check task 31 performs processing of inquiring about a remaining time (S181). In the processing of inquiring about the remaining time, the RAM check task 31 determines whether the remaining time of TP2 includes an allowance for execution of the RAM check (S182).

In the seventh embodiment, the execution memory 11 to be subjected to the RAM check is a memory in which exclusive control over access to the execution memory 11 is performed. Specifically, in the RAM check (S183), which is described later, access from another task to the execution memory 11 is locked for a certain period of time and is unlocked after a certain range of the execution memory 11 is checked. Accordingly, when switching to another TP occurs during execution of the RAM check, the RAM check task 31 remains locked. In other words, the tasks belonging to another TP are inhibited from accessing the execution memory 11. For this reason, in the seventh embodiment, the RAM check (S183) is carried out when there is an allowance for execution of the RAM check.

Here, FIG. 30 shows more detailed processing in step S182. In the case of making an inquiry about the remaining time, the RAM check task 31 calculates, in the inquiry about the remaining time (S191), the remaining time based on free-run timer values. Specifically, the RAM check task 31 subtracts the free-run timer value at the start of TP2, which is stored in the execution memory 11 by the partition scheduler 21, from the current value of the free-run timer, thereby calculating an elapsed time Ta since the time when TP2 is activated. The RAM check task 31 subtracts the elapsed time Ta from the time of TP2, thereby calculating the remaining time of TP2. For example, information indicating the time of TP2 is preliminarily stored in the execution memory 11. Then, the RAM check task 31 calculates the remaining time of TP2 by referring to the information.

When the remaining time of TP2 does not include an allowance (No in S182), the RAM check task 31 interrupts the processing (S184). At this time, the RAM check task 31 sleeps, for example, to release the execution time of the processor 10.

When the remaining time of TP2 includes an allowance (Yes in S182), the RAM check task 31 carries out the RAM check (S183).

As described above, in the seventh embodiment, in the case where the remaining period of TP2 is shorter than the period required for the RAM check processing when the RAM check processing is executed in the RAM check task 31, the processing of the RAM check task 31 is interrupted, and the execution time of the processor 10 is released. This prevents a series of processing which should not be interrupted, such as the RAM check processing, from being interrupted due to TP switching. Further, when the remaining period of TP2 is equal to or longer than the period required for the RAM check processing, the RAM check processing is executed. This eliminates the need for exclusive control in the RAM check processing, since it is guaranteed that switching from TP2 to another TP does not occur until the end of the RAM check processing.

Moreover, the present invention is not limited to the above embodiments, and various modifications can be made without departing from the scope of the present invention as described above. For example, the present invention can also be carried out by combining all or any of the first to seventh embodiments.

While the embodiments of the invention have exemplified the case where the OS includes TP1 to TP4, the types and the number of TPs are not limited thereto. Further, the scheduling patterns are not limited to those exemplified in the embodiments of the invention. Furthermore, the types and the number of tasks belonging to TPs are also not limited to those exemplified in this embodiment.

Reference Signs List

1, 2 SAFETY CONTROLLER
10 PROCESSOR
11 EXECUTION MEMORY
12 I/O PORT
13 NON-VOLATILE MEMORY
14 RESET CIRCUIT
15 MICROCONTROLLER
21 PARTITION SCHEDULER
22 SCHEDULING TABLE
23, 25, 27, 29 TASK SCHEDULER
24 SAFETY MONITORING TASK
26, 26A, 26B NORMAL CONTROL TASK
28, 28A, 28B, 28C, 30 SAFETY CONTROL TASK
31 RAM CHECK TASK
100 OPERATING SYSTEM
101 SAFETY MONITORING APPLICATION
102 NORMAL CONTROL APPLICATION
103 SAFETY CONTROL APPLICATION
104 RAM CHECK APPLICATION

The invention claimed is:

1. A safety controller comprising:
a processor;
a system program for controlling allocation of an execution time of the processor to a safety-related task for executing processing related to ensuring of functional safety of a control target, and to a non-safety-related task for executing other processing related to control of the control target; and
a storage unit that stores end information indicating an end of processing in each of the tasks, wherein
the processor executes the system program to schedule the tasks in accordance with scheduling information indicating scheduling contents of a safety-related time partition in which the execution time is allocated to the safety-related task when the safety-related task is in a ready state, and of a non-safety-related time partition in which the execution time is allocated to the non-safety-related task when the non-safety-related task is in the ready state, so as to start a period of at least one of the safety-related time partition and the non-safety-related time partition in a constant cycle,
the processor executes a task in a time partition in the constant cycle to store, upon completion of processing in the task, the end information indicating an end of the processing in the task into the storage unit, and releases the execution time for the task to bring the task into the ready state,
the processor inhibits, in the scheduling, allocation of the execution time to the task in the time partition in the constant cycle in a case where the end information is stored in the storage unit, even when the task in the time partition in the constant cycle is in the ready state, and
the processor executes the system program to delete the end information stored in the storage unit during a period between an end of the period of the time partition in the constant cycle and a start of a period in a next cycle of the time partition.

2. The safety controller according to claim 1, wherein
in the time partition in the constant cycle, the execution time is further allocated to at least one given processing task for executing given processing, the given processing task having a lower priority than the safety-related task and the non-safety-related task,
the processor executes the given processing task to store, upon completion of processing in the given processing task, the end information indicating an end of the processing in the given processing task into the storage unit, and releases the execution time for the given processing task to bring the given processing task into the ready state, and
the processor preferentially allocates, in the scheduling, the execution time to a task having a higher priority, and inhibits allocation of the execution time to the task in a case where the end information indicating an end of processing in the task is stored in the storage unit, even when the task in the time partition in the constant cycle is in the ready state.

3. The safety controller according to claim 1, wherein in the scheduling, in a case where the period of the time partition in the constant cycle has expired, when the end information indicating the end of the processing of the task in the time partition is not stored in the storage unit, the processor determines occurrence of an abnormality and executes processing according to the abnormality.

4. The safety controller according to claim 1, wherein
a start timing for starting execution of a task in a time partition in the constant cycle, and an end determination timing for determining an end of the execution of the task are preliminarily set for the time partition in the constant cycle, and
in the scheduling, when the period of the time partition whose start timing is set starts, the processor starts execution of the task in the time partition, and when the period of the time partition whose end determination timing is set ends and when the end information is not stored in the storage unit, the processor determines occurrence of an abnormality and executes processing according to the abnormality.

5. The safety controller according to claim 1, wherein
in one of the safety-related time partition and the non-safety-related time partition, the execution time is further allocated to at least one given processing task for executing given processing, the given processing task having a lower priority than one of the safety-related task and the non-safety-related task in one of the safety-related time partition and the non-safety-related time partition, and
in the scheduling, the processor preferentially allocates the execution time to a task having a higher priority.

6. The safety controller according to claim 5, wherein the processor executes the given processing task to release the execution time for the given processing task when a period required to complete one of the safety-related time partition and the non-safety-related time partition in which the execution time is allocated to the given processing task is shorter than a period required for processing executed in the arbitrary processing task.

7. A safety control method comprising the steps of:
scheduling a safety-related task for executing processing related to ensuring of functional safety of a control target, and a non-safety-related task for executing other processing related to control of the control target in accordance with scheduling information indicating scheduling contents of a safety-related time partition in which an execution time of a processor is allocated to the safety-related task when the safety-related task is in a ready state, and of a non-safety-related time partition in which the execution time is allocated to the non-safety-related task when the non-safety-related task is in the ready state, so as to start a period of at least one of the safety-related time partition and the non-safety-related time partition in a constant cycle, and allocating, in the time partition in the constant cycle, the execution time to the task in the time partition in the constant period;
storing, upon completion of execution of processing in the task to which the execution time is allocated, end information indicating an end of the processing in a storage unit, and releasing the execution time for the task to bring the task into the ready state;
inhibiting allocation of the execution time to a task in a case where the end information is stored in the storage unit, even when the task in the time partition in the constant cycle is in the ready state, in the scheduling of the tasks in the time partition in the constant cycle; and
deleting the end information stored in the storage unit during a period between an end of the period of the time partition in the constant cycle and a start of a period in a next cycle of the time partition.

\* \* \* \* \*